(12) United States Patent
Jang et al.

(10) Patent No.: US 11,838,951 B2
(45) Date of Patent: Dec. 5, 2023

(54) TECHNIQUE FOR CONTROLLING PLURALITY OF WIRELESS COMMUNICATION LINKS

(71) Applicant: LG ELECTRONICS INC., Seoul (KR)

(72) Inventors: Insun Jang, Seoul (KR); Suhwook Kim, Seoul (KR); Jeongki Kim, Seoul (KR); Kiseon Ryu, Seoul (KR); Taewon Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 17/276,751

(22) PCT Filed: Sep. 17, 2019

(86) PCT No.: PCT/KR2019/011981
§ 371 (c)(1),
(2) Date: Mar. 16, 2021

(87) PCT Pub. No.: WO2020/060145
PCT Pub. Date: Mar. 26, 2020

(65) Prior Publication Data
US 2022/0053559 A1    Feb. 17, 2022

Related U.S. Application Data

(60) Provisional application No. 62/770,695, filed on Nov. 21, 2018.

(30) Foreign Application Priority Data

Sep. 17, 2018 (KR) .................. 10-2018-0111111

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC ......... H04W 74/0808; H04W 74/0816; H04W 84/12
See application file for complete search history.

(56) References Cited

U.S. PATENT DOCUMENTS 11,083,016 B2 * 8/2021 Morioka ........... H04W 74/0816
2016/0262173 A1 * 9/2016 Josiam ................ H04W 72/543
(Continued)

FOREIGN PATENT DOCUMENTS

| KR | 10-2017-0105035 | 9/2017 |
| KR | 10-2017-0125092 | 11/2017 |
| KR | 10-2018-0086414 | 7/2018 |

OTHER PUBLICATIONS

PCT International Application No. PCT/KR2019/011981, International Search Report dated Dec. 26, 2019, 4 pages.
(Continued)

*Primary Examiner* — Pao Sinkantarakorn
(74) *Attorney, Agent, or Firm* — LEE, HONG, DEGERMAN, KANG & WAIMEY PC

(57) ABSTRACT

One embodiment according to the present specification relates to a method for transmitting, from a first link, information for setting a NAV in a second link. When transmission STA performs communication through a second link, the transmission STA can transmit, through a first link, information for setting the NAV for the second link in another STA. Particularly, the transmission STA can receive, from the second reception STA, a second frame through the second link. The transmission STA can transmit, to a first
(Continued)

reception STA, a first frame through the first link during the reception of the second frame. The first frame can include information for setting the NAV for the second link. The first reception STA can set the NAV for the second link on the basis of the first frame.

14 Claims, 36 Drawing Sheets

(56) References Cited

U.S. PATENT DOCUMENTS

| | | | | |
|---|---|---|---|---|
| 2017/0127424 | A1* | 5/2017 | Kherani | H04W 74/0825 |
| 2017/0201956 | A1* | 7/2017 | Huang | H04W 74/006 |
| 2017/0257888 | A1* | 9/2017 | Kneckt | H04W 74/0816 |
| 2019/0007973 | A1* | 1/2019 | Lou | H04W 74/0816 |
| 2019/0090278 | A1* | 3/2019 | Chu | H04L 5/1461 |
| 2021/0037571 | A1* | 2/2021 | Murayama | H04W 74/0816 |

OTHER PUBLICATIONS

Patil et. al., "Resolutions to various CIDs in Trigger Frame format", IEEE P802.11 Wireless LANs, IEEE 802.11-18/0366r2, Mar. 2018, 9 pages.

Samsung, "Channel Access for NR Unlicensed Operation", 3GPP TSG-RAN WG1 Meeting #AH 1801, R-1180478, Jan. 22-26, 2018, 4 pages.

Samsung, "Channel Access for NR Unlicensed Operation", 3GPP TSG-RAN WG1 Meeting #AH 1801, R-1800478, Jan. 22-26, 2018, 4 pages.

* cited by examiner

FIG. 3

| Channel | F₀ (MHz) | North America | Japan | Most of world |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | Yes | Yes | Yes |
| 14 | 2484 | Yes | 11b Only | No |

FIG. 27

4~6 bits

| NAV value |
|---|

FIG. 28

4~6 bits

| Gap value |

TECHNIQUE FOR CONTROLLING PLURALITY OF WIRELESS COMMUNICATION LINKS

CROSS-REFERENCE TO RELATED APPLICATIONS

This application is the National Stage filing under 35 U.S.C. 371 of International Application No. PCT/KR2019/011981, filed on Sep. 17, 2019, which claims the benefit of earlier filing date and right of priority to Korean Patent Application No. 10-2018-0111111 filed on Sep. 17, 2018, and also claims the benefit of U.S. Provisional Application No. 62/770,695 filed on Nov. 21, 2018, the contents of which are all hereby incorporated by reference herein in their entirety.

BACKGROUND OF THE DISCLOSURE

Field of the Disclosure

The present disclosure relates to a method of controlling radio links in various wireless communication systems including a wireless local area network (WLAN) system.

Related Art

Wireless network technologies may include various types of WLANs. WLANs may be used to interconnect nearby devices together by employing widely used networking protocols. Various technical features described herein may be applied to a certain communication standard such as WiFi or, more generally, any member of the IEEE 802.11 family of wireless protocols.

In the WLAN, methods for preventing collisions between packets have been improved in various ways. For example, the related art standard proposed carrier sense multiple access with collision avoidance (CSMA/CA) as one of various methods.

This disclosure improves the existing standard or proposes technical features that may be used in a new communication standard. Specifically, a station (STA) may set a network allocation vector (NAV) that serves as a timer for reserving media use. In addition, the STA may prevent a collision in a channel (or band) through the NAV.

SUMMARY

It is common for an STA (Station) based on the existing IEEE 802.11 standard to use one channel to transmit one packet or frame. Thus, the existing STA did not need to transmit a signal through a plurality of channels within a transmission opportunity (TXOP). Since the IEEE 802.11be standard, multi-link may be supported.

An example according to the present disclosure proposes a method and device of controlling a plurality of links in a wireless LAN system. Specifically, a first receiving STA and a second receiving STA may have a hidden relationship. Accordingly, while the second receiving STA transmits a signal to a transmitting STA, the first receiving STA may also transmit a signal to the transmitting STA through the same link. In this case, a collision may occur. Therefore, a NAV setting may be requested in the first receiving STA. Specifically, a method of transmitting information for setting the NAV to the first receiving STA through another link, while the transmitting STA is receiving a signal from the second receiving STA through one link, may be required.

In an aspect, a method performed in a wireless local area network (WLAN) system according to various embodiments of the present disclosure may include: receiving, by a transmitting station (STA) supporting multiple links including a first link and a second link, a second frame from a second receiving STA through the second link; and transmitting, by the transmitting STA, a first frame including information for setting a network allocation vector (NAV) for the second link to a first receiving STA through the first link, while receiving the second frame.

Advantageous Effects

An example of the present disclosure proposes various technical effects.

For example, according to an example proposed in the present disclosure, in order to solve a hidden node problem that may occur during flexible DL/UL transmission for multiple links, when a signal is being received through one link, information for setting a NAV may be transmitted through another link. Such a method may reduce a collision probability and enable efficient data transmission.

For example, the information for setting the NAV may be included in a physical layer (PHY) header and may also be included in a medium access control (MAC) header. When the information for setting the NAV is included in the PHY header, the transmitting STA may transmit the information for setting the NAV for the other link and the transmission link at the time of data transmission. When the information for setting the NAV is included in the MAC header, the information for setting the NAV may be transmitted to a specific STA other than all STAs within coverage.

BRIEF DESCRIPTION OF THE DRAWINGS

FIG. 3 illustrates a frequency domain used in a WLAN system.

FIG. 27 is a diagram illustrating a field configuration for network allocation vector (NAV) value.

FIG. 28 is a diagram illustrating a field configuration for a gap value.

DESCRIPTION OF EXEMPLARY EMBODIMENTS

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or a new WLAN stand which has enhanced IEEE 802.11be.

Hereinafter, in order to describe a technical feature of the present specification, a technical feature of a WLAN system to which the present specification is applicable will be described.

Figure 1:
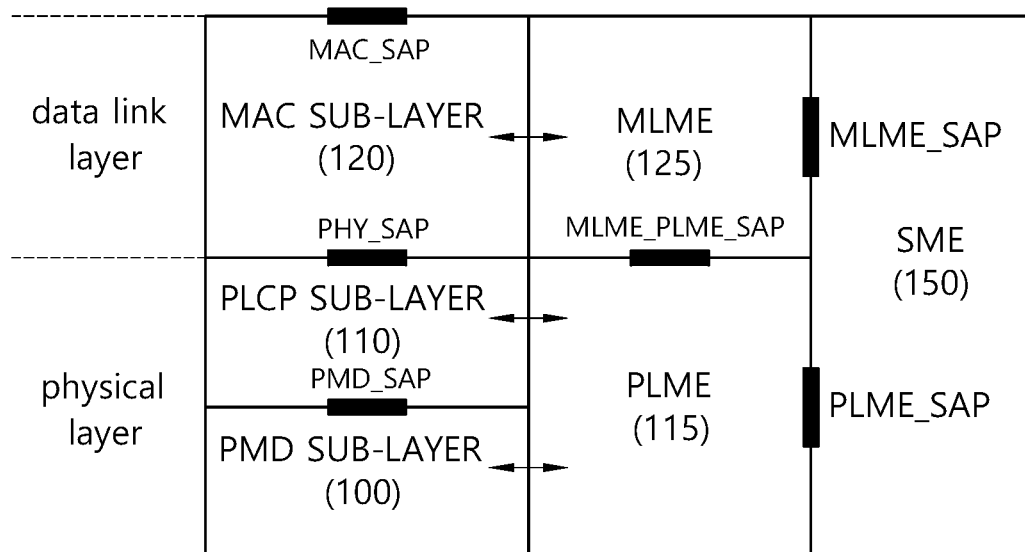
FIG. 1 is a conceptual view illustrating a layered architecture of a WLAN system supported by IEEE 802.11.

FIG. 1 is a conceptual view illustrating a layered architecture of a WLAN system supported by IEEE 802.11. Referring to FIG. 1, the layered architecture of the WLAN system may include a physical medium dependent (PMD) sublayer 100, a physical layer convergence procedure (PLCP) sublayer 110, and a medium access control (MAC) sublayer 120.

The PLCP sublayer 100 may serve as a transmission interface for transmitting/receiving data between a plurality of STAs. The PLCP sublayer 110 is implemented such that the MAC sublayer 120 is operated with a minimum dependency with respect to the PMD sublayer 100.

The PMD sublayer 100, the PLCP sublayer 110, and the MAC sublayer 120 may conceptually include respective management entities. For example, the management entity of the MAC sublayer 120 is referred to as a MAC layer management entity (MLME) 125. The management entity of the physical layer is referred to as a PHY layer management entity (PLME) 115.

The management entities may provide an interface for performing a layer management operation. For example, the PLME 115 may be connected to the MLME 125 to perform a management operation of the PLCP sublayer 110 and the PMD sublayer 100. The MLME 125 may be connected to the PLME 115 to perform a management operation of the MAC sublayer 120.

An STA management entity (SME) 150 may exist to perform a proper MAC layer operation. The SME 150 may be operated as a constitutional element independent of each layer. The PLME 115, the MLME 125, and the SME 150 may mutually transmit and receive information on the basis of a primitive.

The operation of each sublayer is briefly described as follows. For example, the PLCP sublayer 110 delivers a MAC protocol data unit (MPDU) received from the MAC sublayer 120 according to an instruction of the MAC layer between the MAC sublayer 120 and the PMD sublayer 100 to the PMD sublayer 100 or delivers a frame from the PMD sublayer 100 to the MAC sublayer 120.

The PMD sublayer 100 is a PLCP sublayer, and may transmit and receive data between a plurality of STAs through a wireless medium. The MPDU delivered from the MAC sublayer 120 is referred to as a physical service data unit (PSDU) in the PLCP sublayer 110. Although the MPDU is similar to the PSDU, if an aggregated MPDU (AMPDU) obtained by aggregating a plurality of MPDUs is delivered, the MPDUs may be individually different from the PSDUs.

The PLCP sublayer 110 adds an additional field including information required by a transceiver of a physical layer in a process of receiving the PSDU from the MAC sublayer 120 and delivering it to the PMD sublayer 100. In this case, the field added to the PSDU may be a PLCP preamble, a PLCP header, and tail bits required to return a convolution encoder to a zero state.

The PLCP sublayer 110 adds the aforementioned fields to the PSDU to generate a PLCP protocol data unit (PPDU) and transmits the PPDU to a receiving station through the PMD sublayer 100. The receiving station receives the PPDU to perform restoration by obtaining information required to restore data from the PLCP preamble and the PLCP header.

The STA as any functional medium including a medium access control (MAC) that follows a regulation of the institute of electrical and electronics engineers (IEEE)

802.11 standard and a physical layer interface for a radio medium may be used as a meaning including both AP and non-AP STAs.

The STA may be called in various names such as a mobile terminal, a wireless device, a wireless transmit/receive unit (WTRU), a user equipment (UE), a mobile station (MS), a mobile subscriber unit, or simply a user.

Figure 2:
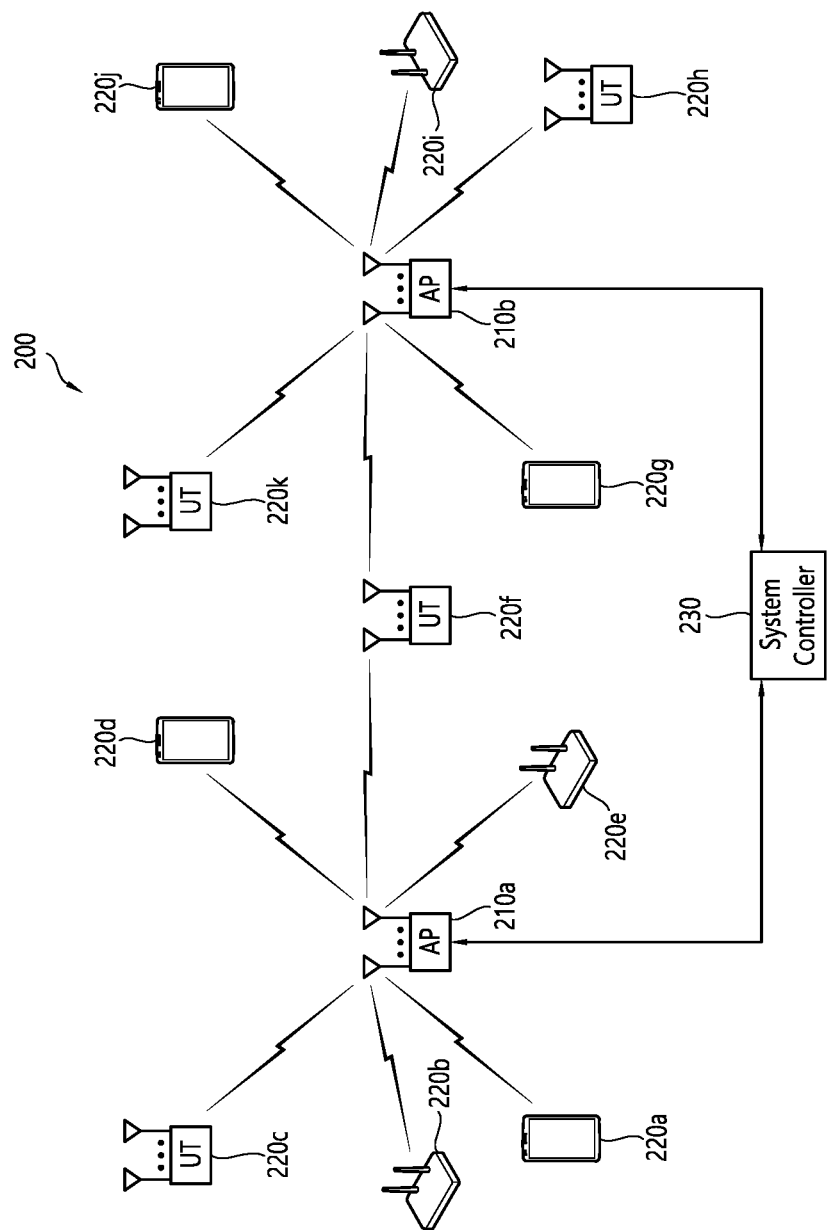
FIG. 2 illustrates an example of a WLAN system.

FIG. 2 illustrates an example of a WLAN system.

As illustrated, the WLAN system includes at least one access point (AP) and a plurality of STAs 520*a/b/c/e/d/f/g/h/i/j/k* associated with the AP. The plurality of STAs in the example of FIG. 2 may perform an AP and/or non-AP function. The plurality of STAs 520*a/b/c/e/d/f/g/h/i/j/k* of FIG. 2 may be called in various terms such as a user terminal (UT), or the like. In addition, the at least one STA 520*f* of FIG. 2 may route/relay communication between the plurality of APs 510*a/b*, or control the plurality of APs, or control the plurality of STA associated with the plurality of APs 510*a/b*.

In addition, the AP 510*a/b* of FIG. 2 may be associated with a system control device 530 to communicate with a different AP, or may communicate with another network entity (e.g., a network entity or Internet server defined by the 3GPP standard) other than the different AP.

The plurality of STAs of FIG. 2 may configure a basic service set (BSS).

BSSs 100 and 105, as a set of an AP and an STA which are successfully synchronized to communicate with each other, are not the concept indicating a specific region. The BSS may include one or more STAs that can be coupled to one AP.

The BSS may include at least one STA, an AP providing a distribution service, and a distribution system connecting a plurality of APs.

The distribution system may configure an extended service set (ESS) as a service set extended by connecting several BSSs. The ESS may be used as a term indicating one network configured by connecting one or more APs through the distribution system. The AP included in one ESS may have the same service set identification (SSID).

A portal may serve as a bridge which connects the WLAN network (IEEE 802.11) and another network (e.g., 802.X).

The network may be configured even between the STAs without the AP to perform communication. Such a network may be called an Ad-Hoc network or an independent basic service set (IBSS).

FIG. 3 illustrates a frequency domain used in a WLAN system.

The WLAN system may use at least one channel defined within a 2.4 GHz band. The 2.4 GHz band may be called in other terms such as a first band or the like.

As shown in FIG. 3, 14 channels may be configured in a 2.4 GHz band. Each channel may be set to a frequency domain (or bandwidth) of 20 MHz. F0 may indicate a center frequency. A center frequency of a channel within the 2.4 GHz band may be configured with an interval of about 5 MHz, except for a channel 14. Among the 14 channels, adjacent channels may overlap with each other. For each county, an allowed frequency channel or a maximum power level within the allowed frequency channel may be set to be different. For example, a channel 13 may be a channel which is not allowed in North America but is allowed in most countries.

A specific numerical value shown in the example of FIG. 3 may be changed.

Figure 4:
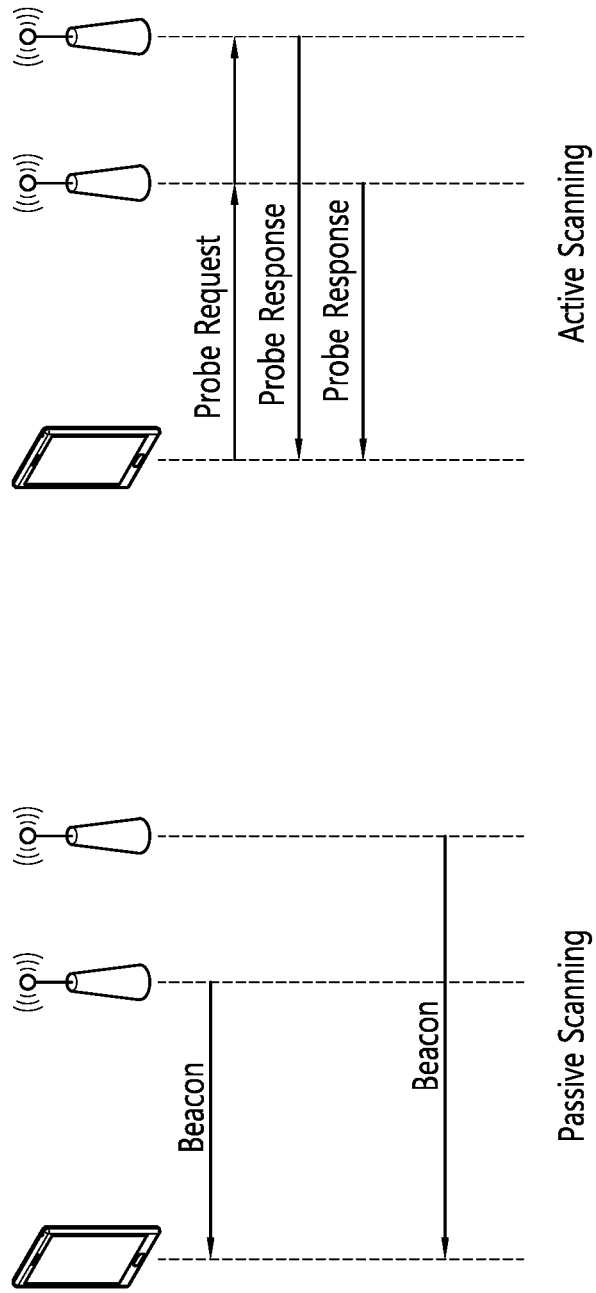
FIG. 4 illustrates an example regarding a network discovery/detection.

FIG. 4 illustrates an example regarding a network discovery/detection.

An STA shall discover a network to access a WLAN network. Such a discovery may be performed through a scanning process for the network. The scanning may be classified into active scanning and passive scanning.

As shown in FIG. 4, an STA performing active scanning may transmit a probe request frame and wait for a response thereof in order to search for a nearby AP while moving from one channel to another. A responder may transmit a probe response frame to the STA which has transmitted the probe request frame, in response to the probe request frame. The responder may be an STA which has last transmitted a beacon frame in a BSS of a channel being scanned. In the BSS, since an AP transmits the beacon frame, the AP is the responder. In an IBSS, since STAs in the IBSS transmit the beacon frame in turn, the responder may be changed.

When the STA transmits the probe request frame through a channel 1 and receives the probe response frame through the channel 1, the STA may store BSS-related information included in the received probe response frame, and may move to a next channel (e.g., a channel 2) to repeat scanning in the same manner.

As shown in FIG. 4, the scanning operation may also be performed in a passive scanning manner. An STA performing scanning based on the passive scanning may receive a beacon frame while moving from one channel to another.

The beacon frame is an example of a management frame in IEEE 802.11. The beacon frame may be periodically transmitted. An STA which has received the beacon frame may store BSS-related information included in the received beacon frame and move to a next channel, and may perform passive scanning in the next channel.

Although not shown in FIG. 4, a plurality of procedures may be performed after the scanning procedure of FIG. 4.

For example, an authentication process may be performed after the scanning procedure. The authentication process may include a process in which an STA transmits an authentication request frame to an AP, and the AP transmits an authentication response frame to the STA in response thereto. An authentication frame used in the authentication request/response corresponds to the management frame.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 5:
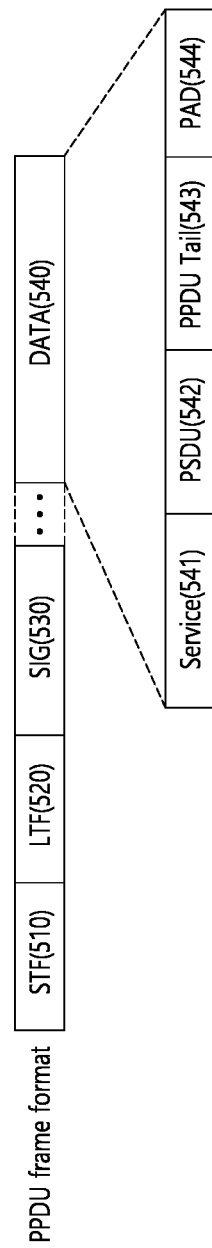
FIG. 5 illustrates an example of a PPDU transmitted/received by an STA of the present specification.

FIG. 5 illustrates an example of a PPDU transmitted/received by an STA of the present specification.

The example of FIG. 5 illustrates a representative field of the PPDU, and an order of fields shown in FIG. 5 may be variously changed.

The PPDU of FIG. 5 may include a short training field (STF) 510.

The STF 510 may be embodied as L-STF, HT-STF, VHT-STF, HE-STF, EHT-STF, or the like described below. The STF 510 may be used for frame detection, automatic gain control (AGC), diversity detection, and coarse frequency/time synchronization.

The PPDU of FIG. 5 may include a long training field (LTF) 520.

The LTF 520 may be embodied as L-LTF, HT-LTF, VHT-LTF, HE-LTF, EHT-LTF, or the like described below. The LTF 520 may be used for fine frequency/time synchronization and channel prediction.

The PPDU of FIG. 5 may include an SIG 530.

The SIG 530 may be embodied as L-SIG, HT-SIG, VHT-SIG, HE-SIG, EHT-SIG, or the like described below. The SIG 530 may include control information for decoding the PPDU.

The PPDU of FIG. 5 may include a data field 540.

The data field 540 may include a service field 541, a physical layer service data unit (PSDU) 542, a PPDU tail bit 543, and a padding bit 544. Some bits of the service field 541 may be used for synchronization of a descrambler at a receiving end. The PSDU 542 may correspond to a MAC protocol data unit (MPDU) defined in a MAC layer, and may include data generated/used in an upper layer. The PPDU tail bit 543 may be used to return an encoder to a zero state. The padding bit 544 may be used to adjust a length of the data field on a specific unit basis.

Figure 6:
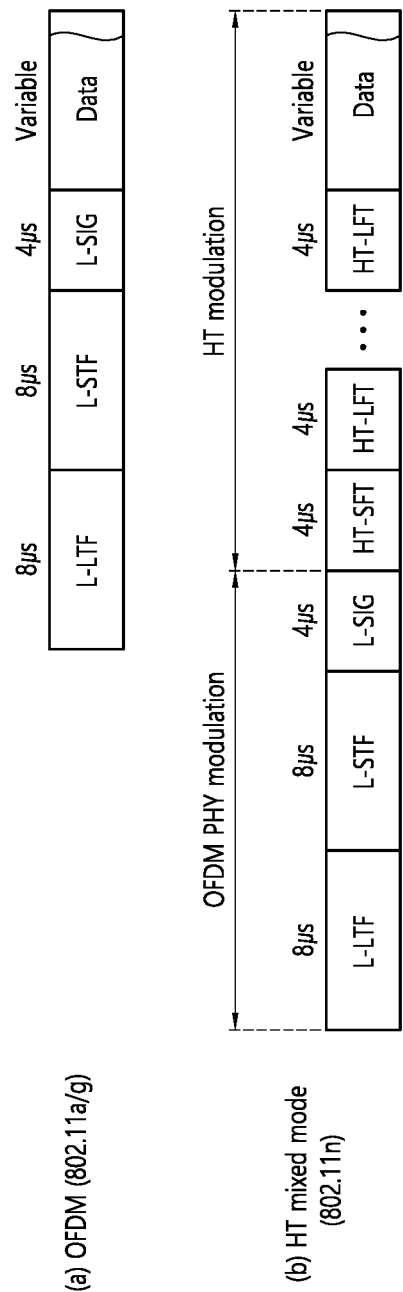
FIG. 6 illustrates an example of a PPDU according to the existing WLAN standard.

FIG. 6 illustrates an example of a PPDU according to the existing WLAN standard.

The PPDU shown in a sub-figure (a) of FIG. 6 is an example of the PPDU used in the IEEE 802.11a/g standard.

The PPDU shown in a sub-figure (b) of FIG. 6 is an example of the PPDU used in the IEEE 802.11n standard.

Figure 7:
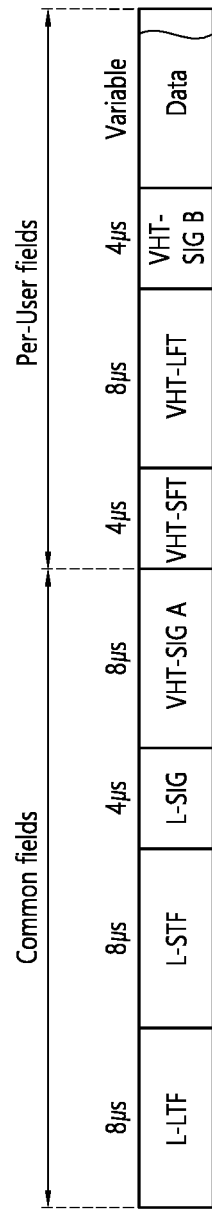
FIG. 7 illustrates another example of a PPDU according to the existing WLAN standard.

FIG. 7 illustrates another example of a PPDU according to the existing WLAN standard.

The example of FIG. 7 illustrates an example of the PPDU according to the IEEE 802.11ac standard. The illustrated common fields include the existing L-STF, L-LTF, and L-SIG, and also include a VHT-SIG-A field newly proposed in the IEEE 802.11ac standard. The PPDU of FIG. 7 may be used both in single user (SU) communication in which a signal is transmitted from an AP to one user STA and multi-user (MU) communication in which a signal is transmitted from the AP to a plurality of user STAs. When the MU communication is performed, the VHT-SIG-A field includes common control information commonly applied to all receiving STAs.

When the MU communication is performed, per-user fields shown in FIG. 7 include a field transmitted for at least any one user STA. The VHT-STF field is an STF field newly proposed in the VHT standard (i.e., IEEE 802.11ac), and the VHT-LTF field is an LTF field newly proposed in the VHT standard. The VHT-SIG-B field may include information for decoding a data field, and may be configured individually for each receiving STA.

The PPDU of FIG. 7 may be transmitted to a plurality of STAs, based on a multi-user multiple input multiple output (MU-MIMO) scheme. In addition, the PPDU may be transmitted to one STA, based on an SU-MIMO scheme.

Figure 8:
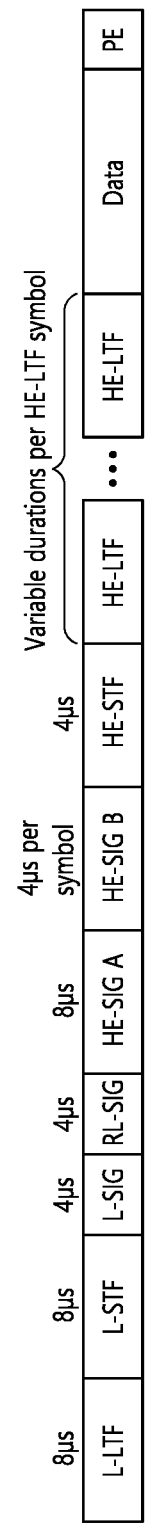
FIG. 8 illustrates another example of an HE-PPDU.

FIG. 8 illustrates another example of an HE-PPDU.

The example of FIG. 8 may be applied to an IEEE 802.11ax or high efficiency (HE) WLAN system. Four types of PPDU formats are defined based on IEEE 802.11ax, and the example of FIG. 8 is an example of an MU-PPDU used in MU communication. However, some of technical features applied to the field shown in FIG. 8 may also be directly used in SU communication or UL-MU communication.

The technical feature of the HE-PPDU shown in FIG. 8 may also be applied to an EHT-PPDU to be newly proposed. For example, the technical feature applied to the HE-SIG may also be applied to the EHT-SIG, and the technical feature applied to the HE-STF/LTF may also be applied to the EHT-STF/LTF.

An L-STF of FIG. 8 may include a short training orthogonal frequency division multiplexing (OFDM) symbol. The L-STF may be used for frame detection, automatic gain control (AGC), diversity detection, and coarse frequency/time synchronization.

An L-LTF of FIG. 8 may include a long training orthogonal frequency division multiplexing (OFDM) symbol. The L-LTF may be used for fine frequency/time synchronization and channel prediction.

An L-SIG of FIG. 8 may be used for transmitting control information. The L-SIG may include information regarding a data rate and a data length. Further, the L-SIG may be repeatedly transmitted. That is, a new format in which the L-SIG is repeated (for example, may be referred to as R-LSIG) may be configured.

An HE-SIG-A of FIG. 8 may include the control information common to a receiving STA.

Specifically, the HE-SIG-A may include information on: 1) a DL/UL indicator; 2) a BSS color field as an identifier of a BSS; 3) a field indicating a remaining time of a current TXOP period; 4) a bandwidth field indicating whether it is 20, 40, 80, 160 and 80+80 MHz; 5) a field indicating an MCS scheme applied to the HE-SIG-B; 6) an indication field regarding whether the HE-SIG-B is modulated by a dual subcarrier modulation scheme for MCS; 7) a field indicating the number of symbols used for the HE-SIG-B; 8) a field indicating whether the HE-SIG-B is generated across a full band; 9) a field indicating the number of symbols of the HE-LTF; 10) a field indicating the length of the HE-LTF and a CP length; 11) a field indicating whether an additional OFDM symbol is present for LDPC coding; 12) a field indicating control information regarding packet extension (PE); and 13) a field indicating information on a CRC field of the HE-SIG-A. A specific field of the HE-SIG-A may be added or partially omitted. Further, some fields of the HE-SIG-A may be partially added or omitted in other environments other than a multi-user (MU) environment.

An HE-SIG-B of FIG. 8 may be included only in the case of the PPDU for the multiple users (MUs) as described above. Basically, an HE-SIG-A or an HE-SIG-B may include resource allocation information (or virtual resource allocation information) for at least one receiving STA.

An HE-STF of FIG. 8 may be used for improving automatic gain control estimation in a multiple input multiple output (MIMO) environment or an OFDMA environment.

An HE-LTF of FIG. 8 may be used for estimating a channel in the MIMO environment or the OFDMA environment.

The size of fast Fourier transform (FFT)/inverse fast Fourier transform (IFFT) applied to the HE-STF and the field after the HE-STF, and the size of the FFT/IFFT applied to the field before the HE-STF may be different from each other. For example, the size of the FFT/IFFT applied to the HE-STF and the field after the HE-STF may be four times greater than the size of the FFT/IFFT applied to the field before the HE-STF.

For example, when at least one field of the L-STF, the L-LTF, the L-SIG, the HE-SIG-A, and the HE-SIG-B on the PPDU of FIG. 8 is referred to as a first field/part, at least one of the data field, the HE-STF, and the HE-LTF may be referred to as a second field/part. The first field may include a field associated with a legacy system, and the second field may include a field associated with an HE system. In this case, the fast Fourier transform (FFT) size and the inverse fast Fourier transform (IFFT) size may be defined as a size which is N (N is a natural number, e.g., N=1, 2, and 4) times greater than the FFT/IFFT size used in the legacy WLAN system. That is, the FFT/IFFT size applied to the second field of the HE PPDU may be N (=4) times greater than that applied to the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/spacing may have a size which is 1/N times (N is the natural number, e.g., N=4, the subcarrier spacing is set to 78.125 kHz) the subcarrier space used in the legacy WLAN system. That is, a subcarrier spacing having a size of 312.5 kHz, which is a legacy subcarrier spacing, may be applied to the first field/part of the HE PPDU and a subcarrier space having a size of 78.125 kHz may be applied to the second field/part of the HE PPDU.

Alternatively, it may be expressed that an IDFT/DFT period applied to each symbol of the first field is N (=4) times shorter than the IDFT/DFT period applied to each data symbol of the second field. That is, it may be expressed that the IDFT/DFT length applied to each symbol of the first field of the HE PPDU is 3.2 μs and the IDFT/DFT length applied to each symbol of the second field of the HE PPDU is 3.2 μs*4 (=12.8 μs). The length of the OFDM symbol may be a value obtained by adding the length of a guard interval (GI) to the IDFT/DFT length. The length of the GI may have various values such as 0.4 μs, 0.8 μs, 1.6 μs, 2.4 μs, and 3.2 μs.

The technical feature in which subcarrier spacings having different sizes are applied to one PPDU may also be applied directly to the EHT-PPDU. That is, a subcarrier spacing of 312.5 kHz may be applied to a first portion/part of the EHT-PPDU, and a subcarrier spacing of 78.125 kHz may be applied to a second field/part of the EHT-PPDU. The first portion/part of the EHT-PPDU may include L-LTF, L-STF, L-SIG, EHT-SIG-A, and/or EHT-SIG-B. In addition, a second portion/part of the EHT-PPDU may include EHT-STF, EHT-LTF, and/or a data field. The division of the first portion/second portion of the EHT-PPDU may be changed Hereinafter, a resource unit (RU) used in the PPDU is described. The RU may include a plurality of subcarriers (or tones). The RU may be used when a signal is transmitted to a plurality of STAs, based on an OFDMA scheme. In addition, the RU may also be defined when a signal is transmitted to one STA. The RU may be used for the STF, the LTF, the data field, or the like.

Figure 9:
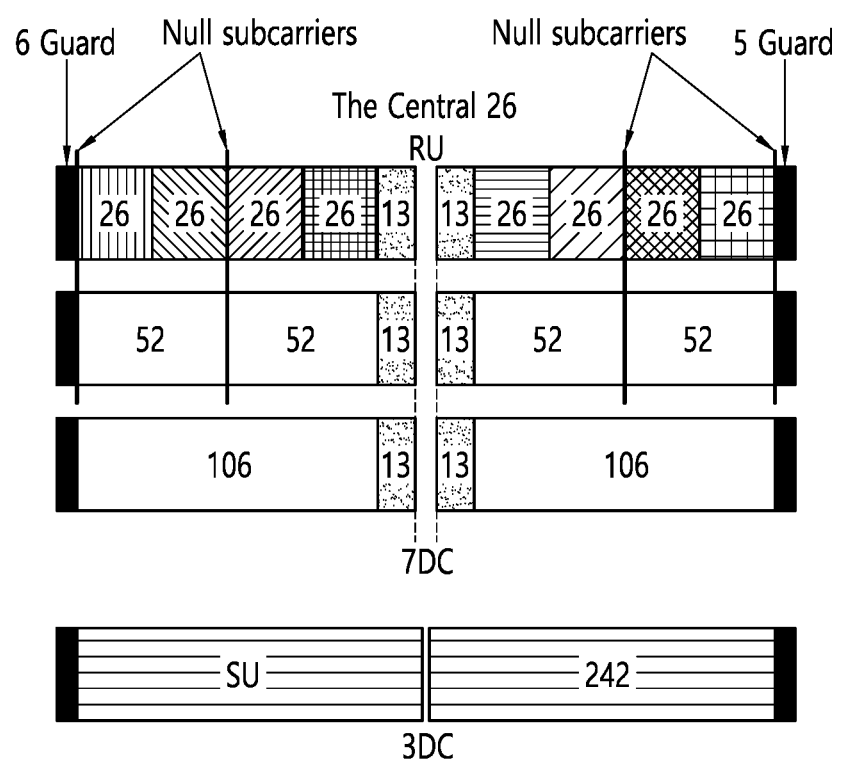
FIG. 9 illustrates a layout of resource units (RUs) used on a 20 MHz band.

FIG. 9 illustrates a layout of resource units (RUs) used on a 20 MHz band.

As illustrated in FIG. 9, RUs corresponding to tones (i.e., subcarriers) different in number may be used to configure some fields of the HE-PPDU. For example, the resources may be allocated by the unit of RUs illustrated for the HE-STF, the HE-LTF, and the data field.

As illustrated in an uppermost part of FIG. 9, a 26-unit (i.e., a unit corresponding to 26 tones) may be disposed. 6 tones may be used as a guard band in a leftmost band of the 20 MHz band, and 5 tones may be used as a guard band in a rightmost band of the 20 MHz band. Further, 7 DC tones may be inserted into a center band, that is, a DC band, and a 26-unit corresponding each 13 tones may be present at left and right sides of the DC band. Further, the 26-unit, a 52-unit, and a 106-unit may be allocated to other bands. Each unit may be allocated for a receiving STA, that is, a user.

Meanwhile, the RU layout of FIG. 9 may be used not only in a multi-user (MU) situation but also in a single user (SU) situation. In this case, as illustrated in a lowermost part of FIG. 9, it is possible to use one 242-unit, and 3 DC tones may be inserted.

In an example of FIG. 9, RUs having various sizes, that is, a 26-RU, a 52-RU, a 106-RU, a 242-RU, and the like are proposed. As a result, since specific sizes of the RUs may be extended or increased, the present embodiment is not limited to a specific size (i.e., the number of corresponding tones) of each RU.

Figure 10:
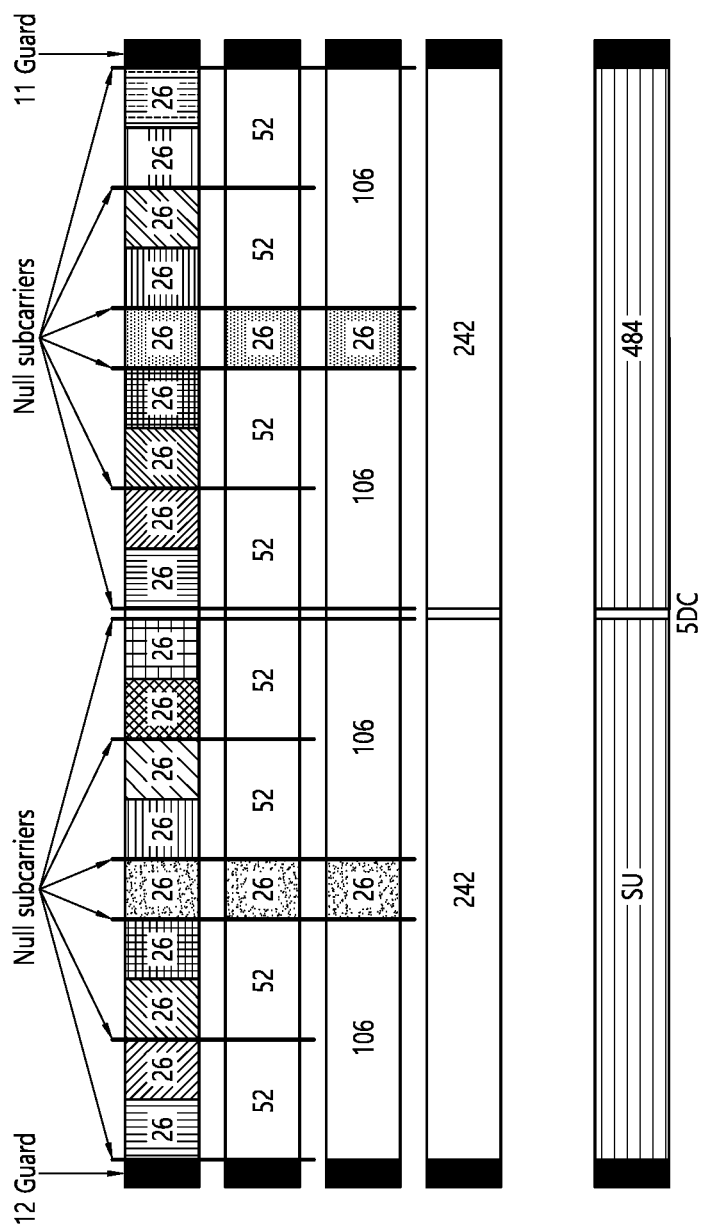
FIG. 10 illustrates a layout of RUs used on a 40 MHz band.

FIG. 10 illustrates a layout of RUs used on a 40 MHz band.

Similarly to a case in which the RUs having various sizes are used in the example of FIG. 9, a 26-RU, a 52-RU, a 106-RU, a 242-RU, a 484-RU, and the like may also be used in an example of FIG. 10. Further, 5 DC tones may be inserted into a center frequency, 12 tones may be used as a guard band in a leftmost band of a 40 MHz band, and 11 tones may be used as a guard band in a rightmost band of the 40 MHz band.

In addition, as illustrated, when used for a single user, the 484-RU may be used. Meanwhile, the specific number of RUs may be changed similarly to the example of FIG. 9.

Figure 11:
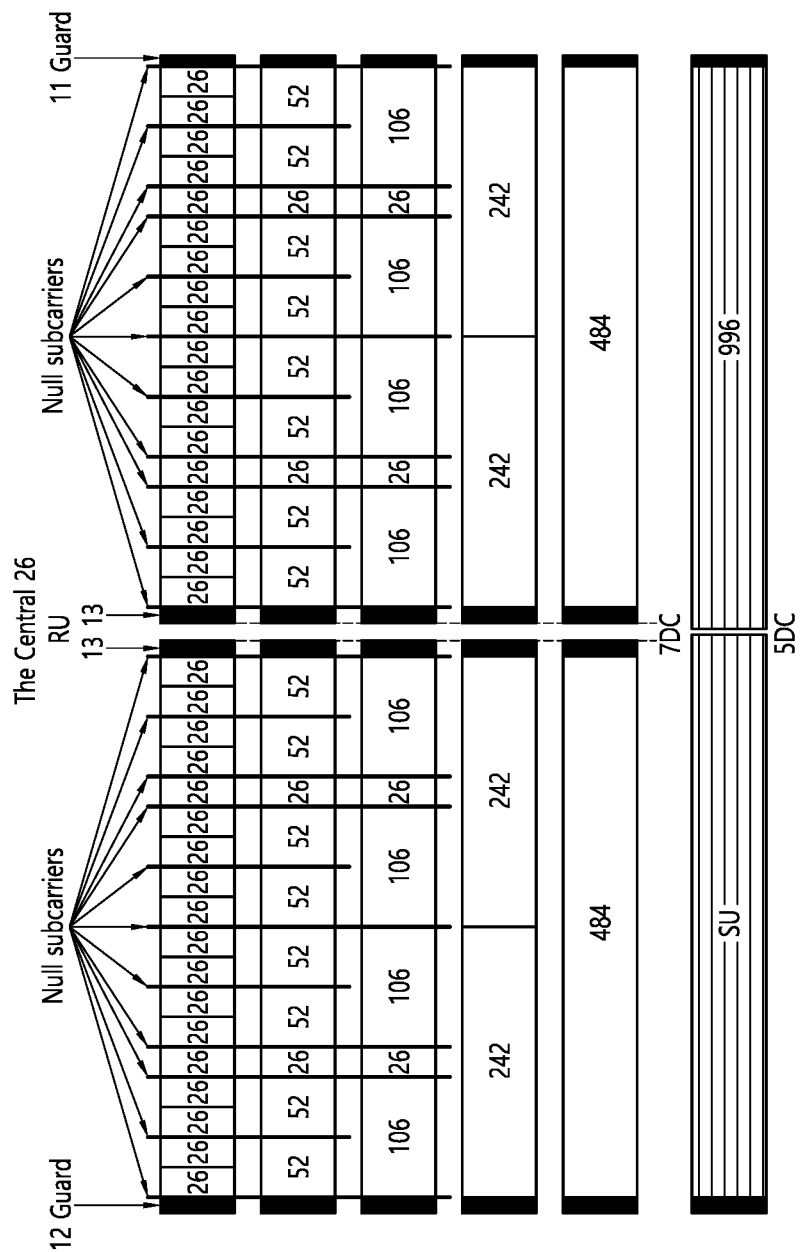
FIG. 11 illustrates a layout of RUs used on an 80 MHz band.

FIG. 11 illustrates a layout of RUs used on an 80 MHz band.

Similarly to a case in which the RUs having various sizes are used in the examples of FIG. 9 and FIG. 10, a 26-RU, a 52-RU, a 106-RU, a 242-RU, a 484-RU, and the like may also be used in an example of FIG. 11. Further, 7 DC tones may be inserted into a center frequency, 12 tones may be used as a guard band in a leftmost band of an 80 MHz band, and 11 tones may be used as a guard band in a rightmost band of the 80 MHz band. Furthermore, the 26-RU, which uses each 13 tones located at left and right sides of the DC band, may be used.

In addition, as illustrated, when used for a single user, the 996-RU may be used. In this case, 5 DC tones may be inserted.

Meanwhile, the specific number of RUs may be changed similarly to the example of FIG. 9 and FIG. 10.

The RU shown in FIG. 9 to FIG. 11 may be used in OFDMA-based communication. That is, any one RU(26/52/106/242-RU, etc.) shown in FIG. 9 to FIG. 11 may be allocated to any one STA, and another RU may be allocated to another STA. That is, MU communication is possible in such a manner that the RU shown in FIG. 9 to FIG. 11 is allocated to a plurality of STAs. The MU communication may be applied to downlink communication and may also be applied to uplink communication.

The MU PPDU shown in FIG. 8 may be used for DL MU communication. That is, the DL-MU communication is possible through an OFDMA and/or MU-MIMO scheme, based on the PPDU of FIG. 8.

In addition, UL MU communication is also supported in the WLAN system. A trigger frame is defined for UL MU communication. The trigger frame may include ID information for a plurality of STAs participating in UL MU communication and a radio resource (e.g., RU information) used in the UL MU communication.

Figure 12:
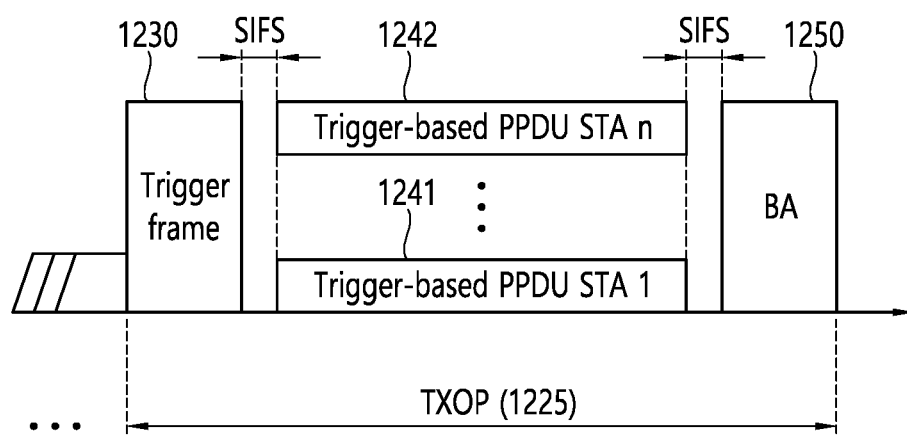
FIG. 12 illustrates an example of UL MU communication.

FIG. 12 illustrates an example of UL MU communication.

According to the example of FIG. 12, an AP transmits a trigger frame 1330. The trigger frame may be defined in the form of a MAC frame, and may be transmitted from the AP by being included in a PPDU of various formats. That is, when the PPDU including the trigger frame 1330 is received in an STA, UL MU communication starts after a short interframe space (SIFS) period. Specifically, a plurality of STAs (i.e., an STA 1 to an STA n) indicated by the trigger frame 1330 perform the UL-MU communication, based on an uplink resource (i.e., RU) indicated by the trigger frame 1330. Specifically, the plurality of STAs (i.e., the STA 1 to the STA n) transmit to the AP a trigger based (TB) PPDU according to the IEEE 802.11ax standard. A plurality of TB PPDUs transmitted by the plurality of STAs may be transmitted in the same time period, and information on the same time period may be included in the trigger frame 1330. Thereafter, the AP may transmit an ACK/NACK signal for TB PPDUs 1341 and 1342 through a block ACK (BA). The UL MU communication may be performed within a period of a TXOP 1325 obtained by the AP.

Figure 13:
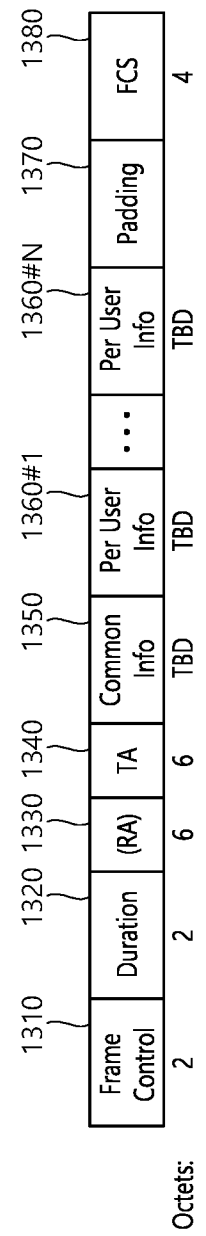
FIG. 13 illustrates an example of a trigger frame.

FIG. 13 illustrates an example of a trigger frame. The trigger frame of FIG. 13 may allocate a resource for uplink multiple-user (MU) transmission, and may be transmitted from an AP. The trigger frame may consist of a MAC frame, and may be included in a PPDU.

Some of fields shown in FIG. 13 may be omitted, and another field may be added. In addition, a length of each field may be changed to be different from that shown in the drawing.

A frame control field 1310 of FIG. 13 may include information on a version of a MAC protocol and extra other control information, and a duration field 1320 may include time information for configuring a network allocation vector (NAV) described below or information on a UE identifier (e.g., AID).

In addition, an RA field 1330 includes address information of a receiving STA of a corresponding trigger frame, and may be optionally omitted. A TA field 1340 includes address information of an STA (e.g., AP) transmitting a corresponding trigger frame, and a common information field 1350 includes common control information applied to the receiving STA which receives a corresponding trigger frame.

Figure 14:
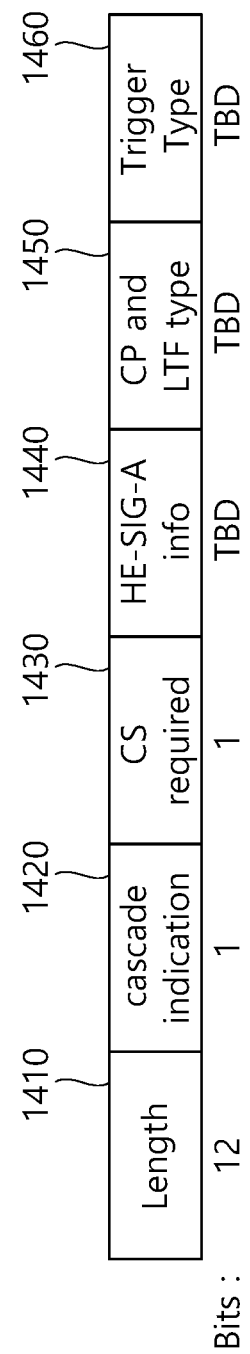
FIG. 14 illustrates an example of a common information field.

FIG. 14 illustrates an example of a common information field. Some of subfields of FIG. 14 may be omitted, and extra subfields may be added. In addition, a length of each of the illustrated subfields may be changed.

A length field 1410 illustrated herein has the same value as a length field of an L-SIG field of an uplink PPDU transmitted in response to a corresponding trigger frame, and the length field of the L-SIG field of the uplink PPDU indicates a length of the uplink PPDU. As a result, the length field 1410 of the trigger frame may be used to indicate a length of a corresponding uplink PPDU.

In addition, a cascade indicator field 1420 indicates whether a cascade operation is performed. The cascade operation implies that downlink MU transmission and uplink MU transmission are performed together within the same TXOP. That is, it implies that the uplink MU transmission is performed when a pre-set time (e.g., SIFS) elapses, after the downlink MU transmission is performed. During the cascade operation, there may be only one transmitting device (e.g., AP) performing downlink communication, and there may be a plurality of transmitting devices (e.g., non-AP) performing uplink communication.

A CS request field 1430 indicates whether it is necessary to consider a radio medium state or an NAV or the like in a situation where a receiving device which has received a corresponding trigger frame transmits an uplink PPDU.

An HE-SIG-A information field 1440 may include information for controlling content of an SIG-A field (i.e., HE-SIG-A field) of an uplink PPDU transmitted in response to a corresponding trigger frame.

A CP and LTF type field 1450 may include information on a CP length and LTF length of an uplink PPDU transmitted in response to a corresponding trigger frame. A trigger type field 1460 may indicate a purpose of using the corresponding trigger frame, for example, typical triggering, triggering for beamforming, a request for block ACK/NACK, or the like.

Meanwhile, the remaining descriptions on FIG. 13 are added as follows.

Per-user information fields 1360 #1 to 1360 #N corresponding to the number of receiving STAs receiving the trigger frame of FIG. 13 are preferably included. The per-user information field may also be called an "RU allocation field".

In addition, the trigger frame of FIG. 13 may include a padding field 1370 and a frame check sequence field 1380.

Each of the per-user information fields 1360 #1 to 1360 #N shown in FIG. 13 preferably includes a plurality of subfields.

Figure 15:
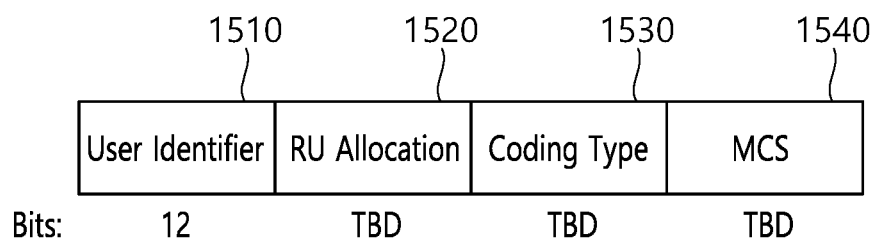
FIG. 15 illustrates an example of a subfield included in a per-user information field.

FIG. 15 illustrates an example of a subfield included in a per-user information field. Some of the subfields of FIG. 15 may be omitted, and extra subfields may be added. In addition, a length of each of the illustrated subfields may be changed.

A user identifier field 1510 of FIG. 15 indicates an identifier of an STA (e.g., a receiving STA) corresponding to per-user information. An example of the identifier may be the entirety or part of an AID.

In addition, an RU allocation field 1520 may be included. That is, when the receiving STA which is identified by using the user identifier field 1510 transmits an uplink PPDU in response to the trigger frame of FIG. 9, the uplink PPDU is transmitted through an RU indicated by the RU allocation field 1520. In this case, the RU indicated by the RU allocation field 1520 preferably indicates the RU shown in FIG. 9, FIG. 10, and FIG. 11.

The subfield of FIG. 15 may include a coding type field 1530. The coding type field 1530 may indicate a coding type of an uplink PPDU transmitted in response to the trigger frame of FIG. 13. For example, when BCC coding is applied to the uplink PPDU, the coding type field 1530 may be set to '1', and when LDPC coding is applied, the coding type field 1530 may be set to '0'.

In addition, the subfield of FIG. 15 may include an MCS field 1540. The MCS field 1540 may indicate an MCS scheme applied to the uplink PPDU transmitted in response to the trigger frame of FIG. 13.

Meanwhile, an STA may transmit various feedback schedules (e.g., buffer status report, channel state information, or the like) based on UL OFDMA random access (UORA) defined according to the IEEE 802.11ax standard.

Figure 16:
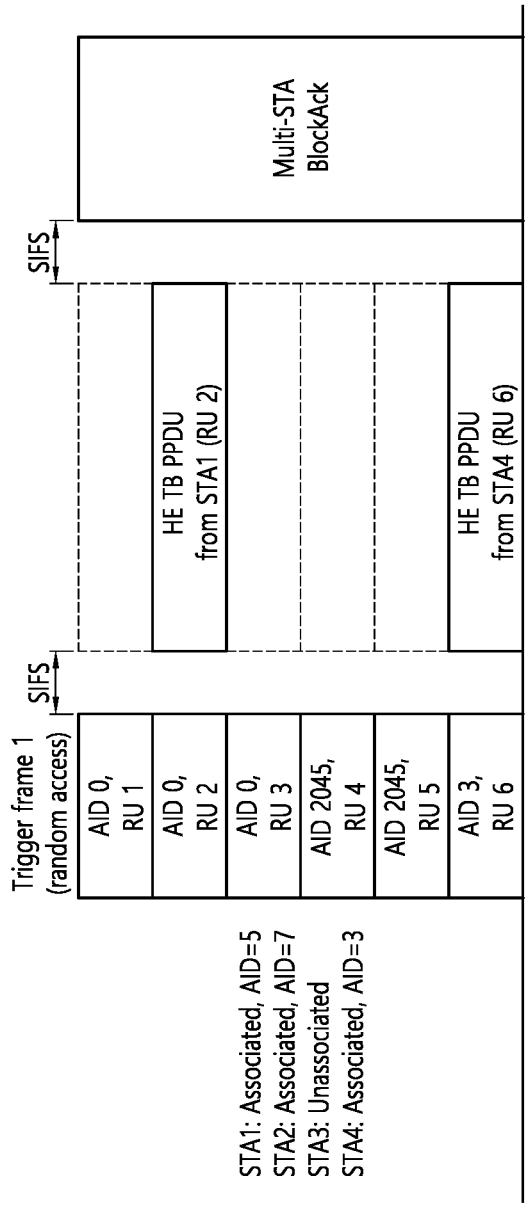
FIG. 16 illustrates a method of performing UORA in a WLAN system.

FIG. 16 illustrates a method of performing UORA in a WLAN system.

As illustrated, an AP may allocate 6 RU resources as shown in FIG. 16 through a trigger frame (e.g., the trigger frame of FIG. 13 to FIG. 15). Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 2045, RU 6). Information on the AID 0 or AID 2045 may be included, for example, in the user identifier field 1110 of FIG. 11. Information on the RU 1 to RU 6 may be included, for example, in the RU allocation field 1120 of FIG. 11. AID=0 may imply a UORA resource for an associated STA, and AID=2045 may imply a UORA resource for an un-associated STA. Accordingly, the 1st to 3rd RU resources of FIG. 16 may be used as a UORA resource for the associated STA, the 4th and 5th RU resources may be used as a UORA resource for the un-associated STA, and the 6th RU resource of FIG. 16 may be used as a typical resource for UL MU.

In the example of FIG. 16, an OFDMA random access backoff (OBO) of an STA1 is decreased to 0, and the STA1 randomly selects the 2nd RU resource (AID 0, RU 2). In addition, since an OBO counter of an STA2/3 is greater than 0, an uplink resource is not allocated to the STA2/3. In addition, regarding an STA4 in FIG. 16, since an AID (e.g., AID=3) of the STA4 is included in a trigger frame, a resource of the RU 6 is allocated without backoff.

Specifically, since the STA1 of FIG. 16 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 16 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 16 is an un-associated STA, the total number of eligible RA RUs for the STA3 is 2 (RU 4, RU 5), and thus the STA3 decreases the OBO counter by 2 but the OBO counter is greater than 0.

Figure 17:
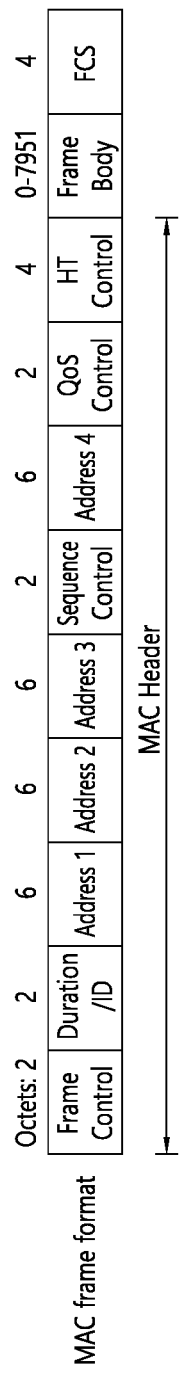
FIG. 17 illustrates an example of a MAC frame.

FIG. 17 illustrates an example of a MAC frame.

The MAC frame of FIG. 17 may be included in a PSDU included in a data field of a PPDU. A length of each of fields shown in FIG. 17 may be changed, and some of the fields may be omitted. As illustrated, the MAC frame may include a MAC header.

The data field may include a service field, a physical layer service data unit (PSDU), and a PPDU tail bit, and may also optionally include a padding bit. Some bits of the service field may be used for synchronization of a descrambler at a receiving end. The PSDU may correspond to a MAC protocol data unit (MPDU) defined in a MAC layer, and may include data generated/used in an upper layer. The PPDU tail bit may be used to return an encoder to a zero state. The padding bit may be used to adjust a length of the data field on a specific unit basis.

The MPDU is defined according to various MAC frame formats, and a basic MAC frame consists of a MAC header, a frame body, and a frame check sequence (FCS). The MAC frame may consist of the MPDU and may be transmitted/received through a PSDU of a data part of the PPDU frame format.

The MAC header includes a frame control field, a duration/ID field, an address field, or the like. The frame control field may include a plurality of pieces of control information required for frame transmission/reception. The duration/ID field may be set to a time for transmitting a corresponding frame or the like.

The duration/ID field included in the MAC header may be set to a 16-bit length (e.g., B0 to B15). Content included in the duration/ID field may vary depending on a frame type and sub-type, whether it is transmitted during a contention free period (CFP), QoS capability of a transmitting STA, or the like. (i) In a control frame of which a sub-type is PS-Poll, the duration/ID field may include an AID of a transmitting STA (e.g., through 14 LSB bits), and 2 MSB bits may be set to 1. (ii) In frames to be transmitted during CFP by a point coordinator (PC) or a non-QoS STA, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, when it is set to B15=0 in the duration/ID field, it may indicate that the duration/ID field is used to indicate a TXOP duration, and B0 to B14 may be used to indicate a real TXOP duration in practice. The real TXOP duration indicated by the B0 to B14 may be any one of values 0 to 32767, and a unit thereof may be microseconds (us). However, when the duration/ID field indicates a fixed TXOP duration value (e.g., 32768), it may be set to B15=1 and B0~B14=0. In addition, when it is set to B14=1 and B15=1, the duration/ID field is used to indicate an AID, and B0 to B13 indicate one of AIDs 1 to 2007.

The frame control field of the MAC header may include Protocol Version, Type, Subtype, To DS, From DS, More Fragment, Retry, Power Management, More Data, Protected Frame, and Order subfields.

The STA (AP and/or non-AP STA) of the present specification may support multi-link communication. The STA supporting multi-link communication may perform communication simultaneously through a plurality of links. That is, the STA supporting multi-link communication may perform communication through the plurality of links during a first time period, and may perform communication through only any one of the plurality of links during a second time period.

The multi-link communication may imply communication supporting the plurality of links, and the link may include one channel (e.g., 20/40/80/160/240/320 MHz channel) defined in a 2.4 GHz band, a 5 GHz band, a 6 GHz band, and a specific band defined in a specific band. Hereinafter, various bands and channels will be described.

Figure 18:
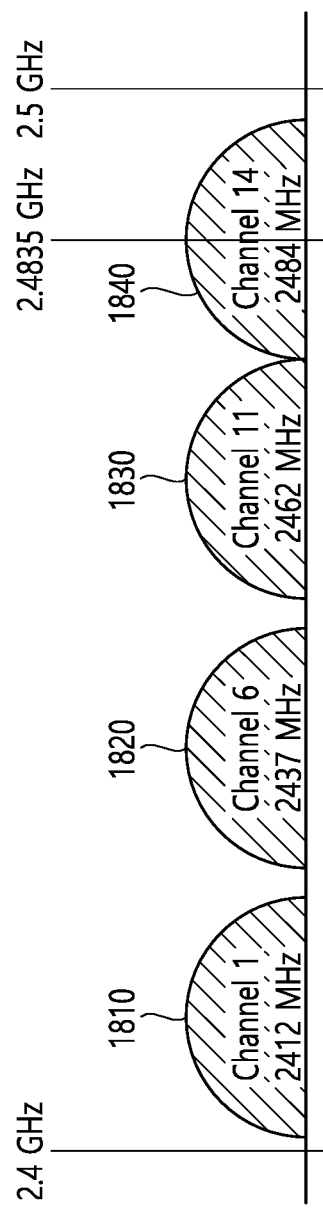
FIG. 18 illustrates an example of a channel used/supported/defined within a 2.4 GHz band.

FIG. 18 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N)GHz. The channel index may be called in various terms such as a channel number or the like. Specific numerical values of the channel index and center frequency may be changed.

FIG. 18 exemplifies 4 channels within a 2.4 GHz band. Each of 1st to 4th frequency domains 1810 to 1840 shown herein may include one channel. For example, the 1st frequency domain 1810 may include a channel 1 (a 20 MHz channel having an index 1). In this case, a center frequency of the channel 1 may be set to 2412 MHz. The 2nd frequency domain 1820 may include a channel 6. In this case, a center frequency of the channel 6 may be set to 2437 MHz. The 3rd frequency domain 1830 may include a channel 11. In this case, a center frequency of the channel 11 may be set to 2462 MHz. The 4th frequency domain 1840 may include a channel 14. In this case, a center frequency of the channel 14 may be set to 2484 MHz.

Figure 19:
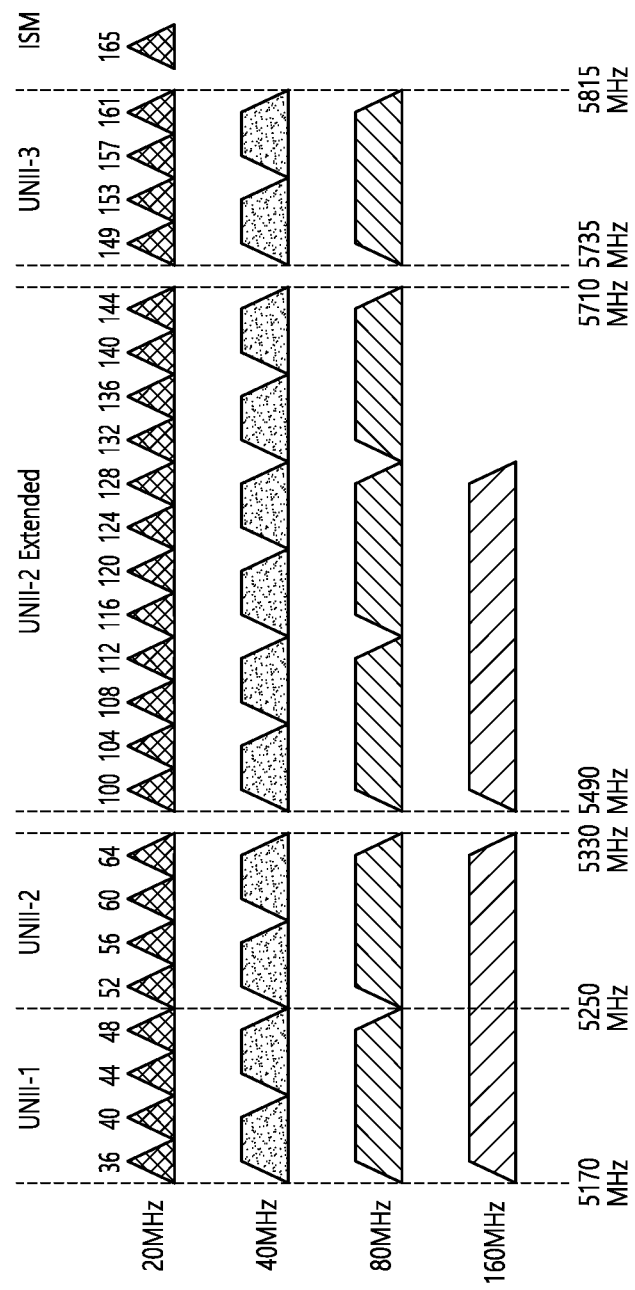
FIG. 19 illustrates an example of a channel used/supported/defined within a 5 GHz band.

FIG. 19 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 19 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 20:
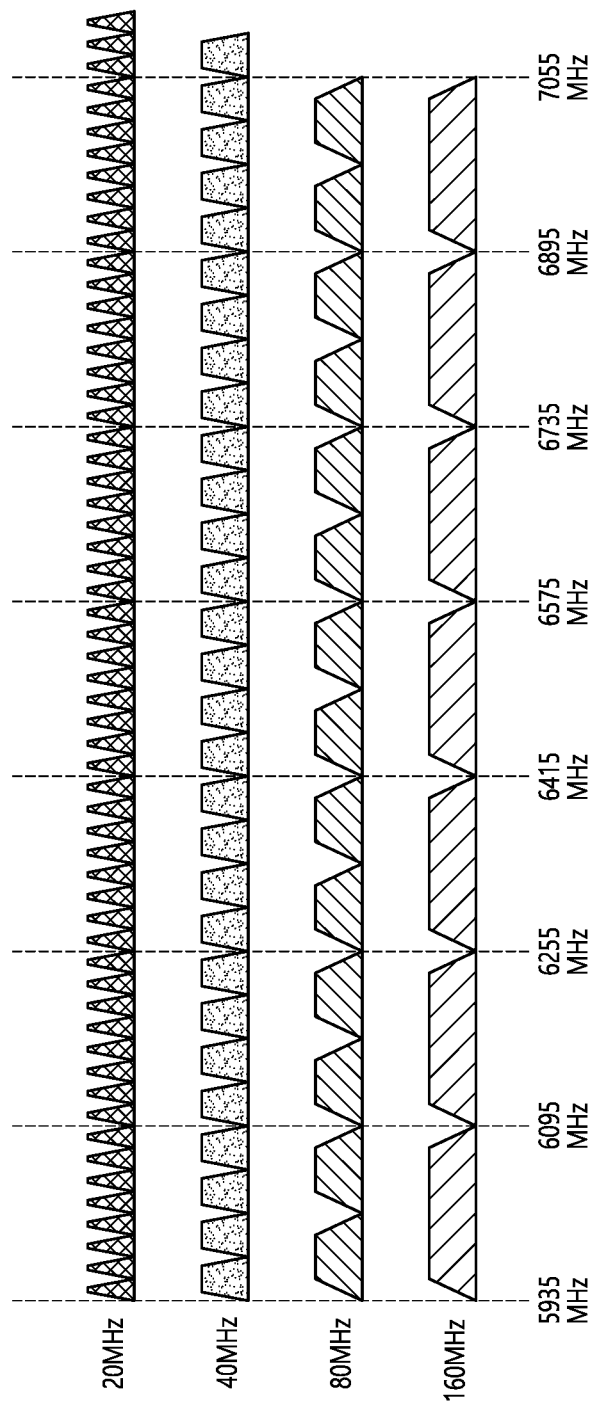
FIG. 20 illustrates an example of a channel used/supported/defined within a 6 GHz band.

FIG. 20 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 20 may be changed.

For example, the 20 MHz channel of FIG. 20 may be defined starting from 5.940 GHz. Specifically, among 20 MHz channels of FIG. 20, a leftmost channel may have an index 1 (o a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 20 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 20 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 20, a 240 MHz channel or a 320 MHz channel may be additionally added.

Hereinafter, the concept of channel bonding will be described.

For example, in an IEEE 802.11n system, 40 MHz channel bonding may be performed by coupling two 20 MHz channels. In addition, in an IEEE 802.11ac system, 40/80/160 Mhz channel bonding may be performed.

For example, an STA may perform channel bonding for a primary 20 MHz channel (P20 channel) and a secondary 20 MHz channel (S20 channel). A backoff count/counter may be used in a channel bonding process. A backoff count value may be selected as a random value, and may be decreased during a backoff interval. In general, when the backoff count value is 0, the STA may attempt an access to a channel.

The STA which performs channel bonding determines whether the S20 channel has maintained an idle state during a specific period (e.g., point coordination function interframe space (PIFS)), at a timing at which a backoff count value for the P20 channel is 0 since it is determined that the P20 channel is in the idle state during the backoff interval. If the S20 channel is in the idle state, the STA may perform bonding for the P20 channel and the S20 channel. That is, the STA may transmit a signal (PPDU) through the 40 MHz channel (i.e., 40 MHz bonding channel) including the P20 channel and the S20 channel.

Figure 21:
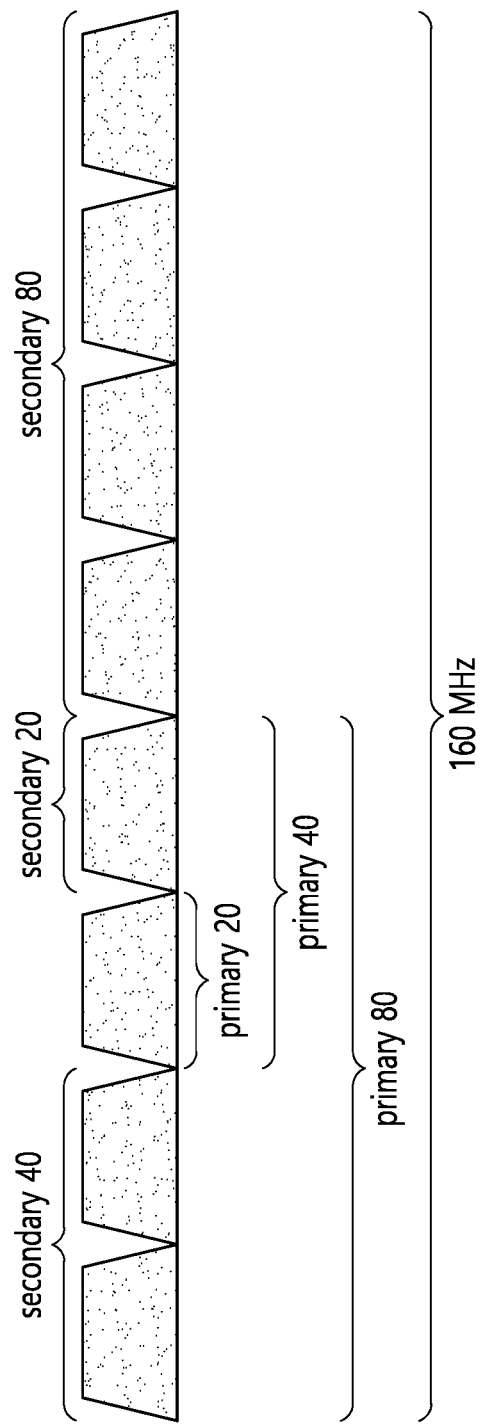
FIG. 21 illustrates an example of channel bonding.

FIG. 21 illustrates an example of channel bonding. As shown in FIG. 21, a primary 20 MHz channel and a secondary 20 MHz channel may configure a 40 MHz channel (primary 40 MHz channel) through channel bonding. That is, the bonded 40 MHz channel may include the primary 20 MHz channel and the secondary 20 MHz channel.

The channel bonding may be performed when a channel consecutive to the primary channel is in an idle state. That is, the primary 20 MHz channel, the secondary 20 MHz channel, a secondary 40 MHz channel, and a secondary 80 MHz channel may be bonded sequentially. If it is determined that the secondary 20 MHz channel is in a busy state, the channel bonding may not be performed even if all other secondary channels are in the idle state. In addition, if it is determined that the secondary 20 MHz channel is in the idle state and the secondary 40 MHz channel is in the busy state, the channel bonding may be performed only for the primary 20 MHz channel and the secondary 20 MHz channel.

Hereinafter, a technical feature for multi-link and aggregation will be described.

An STA (AP and/or non-AP STA) of the present specification may support multi-link communication. That is, the STA may transmit/receive a signal simultaneously through a first link and a second link, based on the multi-link. That is, the multi-link may imply a scheme in which one STA transmits/receives a signal simultaneously through a plurality of links. For example, transmitting of a signal through any one link and receiving of a signal through another link may also be included in multi-link communication. An STA supporting a multi-link may use a plurality of links in a first time period, and may use only one link in a second time period.

Figure 22:
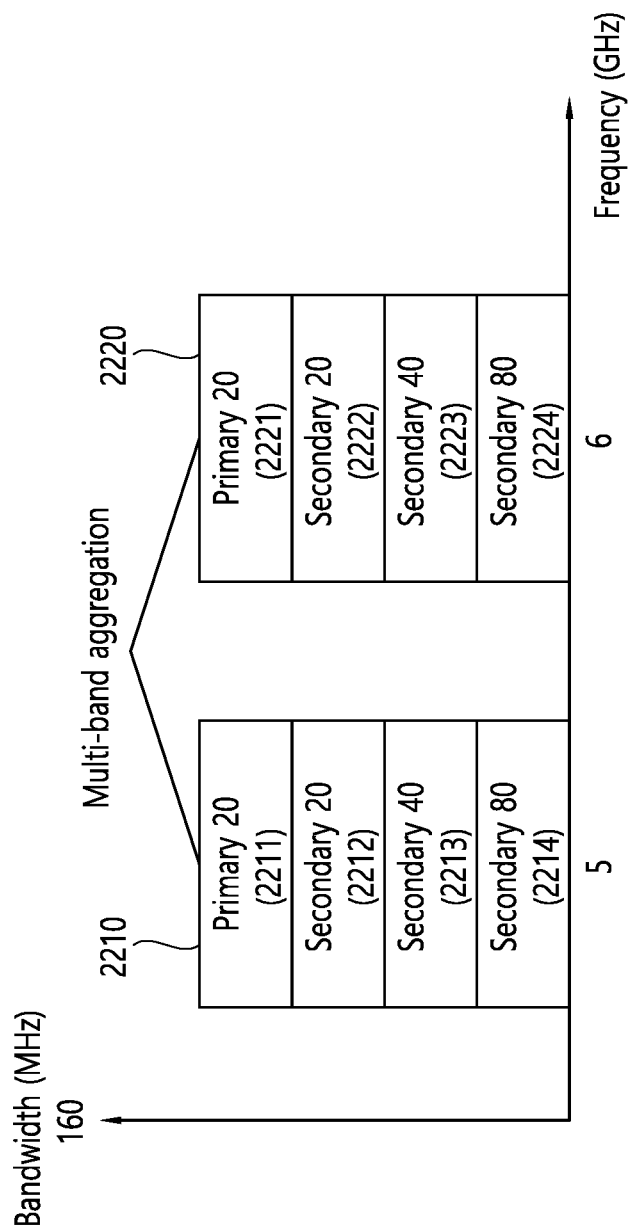
FIG. 22 illustrates a technical feature of a link used in a multi-link.

FIG. 22 illustrates a technical feature of a link used in a multi-link.

A link used in a multi-link may have at least one of technical features as follows. A feature regarding a link described below is for exemplary purposes, and an additional technical feature is also applicable.

For example, respective links used in the multi-link may be included in different bands. That is, when the multi-link in use supports first and second links, each of the first and second links is included within a 2.4 GHz band, a 5 GHz band, or a 6 GHz band, but the first link and the second link may be included in different bands.

Referring to FIG. 22, a first link 2210 and a second link 220 may be used for the multi-link. The first link 2210 of FIG. 22 may be included, for example, in the 5 GHz band. The second link 2220 of FIG. 22 may be included, for example, in the 6 GHz band.

Each of the links included in the multi-link may also be included in the same band. For example, when the multi-link in use supports the first/second/third links, all of the links may be included in the same band, or the first/second links may be included in a first band and the third link may be included in a second band.

The multi-link may be configured based on different RF modules (e.g., a transmitting/receiving device including an IDFT/IFFT/DFT/FFT block and a baseband processing device). Additionally or alternatively, a plurality of links included in the multi-link may be discontinuous in a frequency domain. That is, among the plurality of links, a frequency gap may exist in a frequency domain corresponding to the first link and a frequency domain corresponding to the second link.

As shown in FIG. 22, the first link 2210 may include a plurality of channels 2211, 2212, 2213, and 2214. An STA may apply the existing channel bonding to the plurality of channels 2211, 2212, 2213, and 2214. That is, when the plurality of channels 2211, 2212, 2213, and 2214 are in an idle state during a specific time period (e.g., during a PIFS), the plurality of channels 2211, 2212, 2213, and 2214 may consist of a single bonding channel, and the single bonding channel may operate through the single link 2210. Alternatively, some channels (e.g., 2211, 2212, and 2214) among the plurality of channels 2211, 2212, 2213, and 2214 may operate through the single link 2210 according to a preamble puncturing scheme newly proposed in the IEEE 802.11ax standard. The aforementioned feature may be equally applied to the second link 2220.

The number (and/or a maximum bandwidth) of channels included in a single link used in the multi-link may have an upper limit. For example, up to four channels may configure the single link as in the example of FIG. 22. Additionally or alternatively, a maximum bandwidth of the single link may be 160 MHz, 240 MHz, or 320 MHz. Additionally or alternatively, the single link may include only continuous channels. A specific numerical value mentioned above may be changed.

A procedure of identifying/specifying/determining a link used in the multi-link relates to an aggregation (or channel aggregation) procedure. The STA may aggregate a plurality of links to perform multi-link communication. That is, the STA may perform: 1) a first procedure of identifying/specifying/determining links aggregated for the multi-link; and 2) a second procedure of performing multi-link communication through the identified/specified/determined links. The STA may perform the first and second procedures as a separate procedure, or may perform the procedures simultaneously as a single procedure.

Hereinafter, a technical feature for the first procedure will be described.

An STA may transmit/receive information on a plurality of links constituting a multi-link. For example, through a beacon, a probe response, an association response, or an extra control frame, an AP may transmit identification information regarding a band in which capability of the multi-link is supported and/or identification information regarding a channel in which capability of the multi-link is supported. For example, when the AP can perform communication by aggregating some channels within a 5 GHz band and some channels within a 6 GHz band, identification information regarding channels that can be aggregated may be transferred to a user STA.

For example, through a probe request, an association response, or an extra control frame, the user STA may also transmit identification information regarding a band in which capability of the multi-link is supported and/or identification information regarding a channel in which capability of the multi-link is supported. For example, when the user STA can perform communication by aggregating some channels within a 5 GHz band and some channels within a 6 GHz band, identification information regarding channels that can be aggregated may be transferred to the AP.

Any one of the plurality of links constituting the multi-link may operate as a primary link. The primary link may perform various functions. For example, when a backoff value of the primary link is 0 (and/or the primary link is idle during a PIFS), an STA may aggregate other links. Information regarding the primary link may also be included in the beacon, the probe request/response, and the association request/response.

The user-STA/AP may specify/determine/obtain a band and/or channel in which the multi-link is performed through a negotiation procedure of exchanging information regarding capability thereof.

For example, through the negotiation procedure, the STA may specify/determine/obtain a first candidate band/channel that can be used for a first link, a second candidate band/channel that can be used for a second link, and a third candidate band/channel that can be used for a third link.

Thereafter, the STA may perform the procedure of identifying/specifying/determining links aggregated for the multi-link. For example, the STA may aggregate at least two bands/channels, based on a backoff count of the first candidate band/channel, second candidate band/channel, and third candidate band/channel and/or a clear channel assessment (CCA) sensing result (whether it is busy/idle). For example, the STA may aggregate the second candidate band/channel which has maintained an idle state during a specific period (during a PIFS), at a timing at which the backoff count value of the first candidate band/channel is 0. That is, the STA may determine/specify the first candidate band/channel as the first link for the multi-link, may determine/specify the second candidate band/channel as the second link for the multi-link, and may perform multi-link communication through the first and second links.

Hereinafter, a technical feature for the second procedure will be described.

For example, when an STA determines to aggregate the first and second links, the STA may perform multi-link communication through the first and second links. For example, the STA may transmit a PPDU of the same length through all of the first and second links. Alternatively, the STA may receive a transmission PPDU through the first link, and may receive a reception PPDU through the second link during an overlapping time period. The STA may perform communication through all aggregated links in a specific time period, and may use only any one link in another time period.

An STA (user-STA/AP) of the present specification may include a plurality of RF modules/units. For example, when the STA transmits a signal of a 2.4 GHz band by using the RF module/unit for a 5 GHz and/or 6 GHz band, performance deterioration may occur in the STA. Therefore, the STA may additionally include the RF module/unit for the 2.4 GHz band, distinct from the RF module/unit for the 5 GHz and/or 6 GHz band.

As described above, the STA of the present specification can operate in various bands/channels. Accordingly, an operation of transferring accurate information regarding a band and/or channel shall be defined for the user-STA/AP.

The present disclosure relates to a method of transmitting information for setting a network allocation vector (NAV) for solving a hidden node problem in a flexible downlink (DL)/uplink (UL) in a wireless LAN system.

Figure 23:
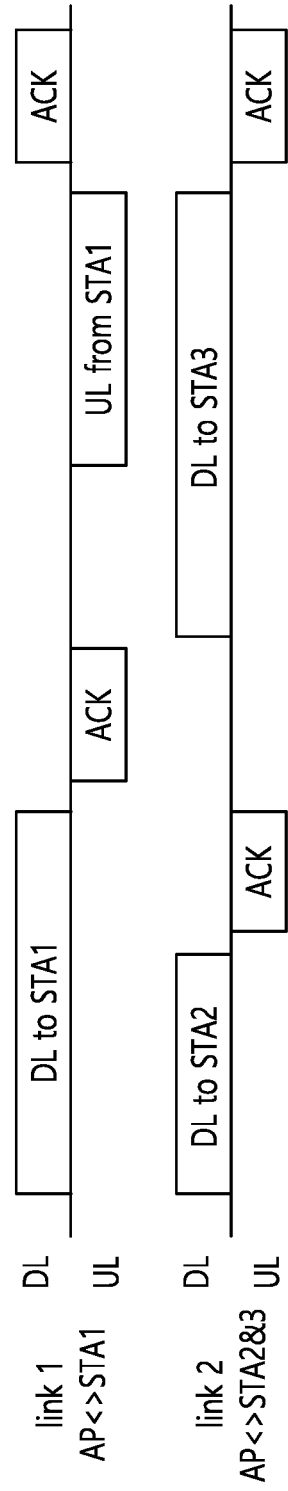
FIG. 23 is a diagram illustrating flexible DL/UL.

FIG. 23 is a diagram illustrating flexible DL/UL (hereinafter, referred to as "FDU").

FDU may refer to a technique in which an STA including a plurality of RFs independently transmits and receives signals (or data) in a plurality of RFs. In the following example, the STA may operate based on FDU, but the following technical features are not limited to the term "flexible DL/UL". Meanwhile, the following technical features may operate in a system that does not require time synchronization between different frames/packets/data units in a multi-link (or multi-band). More specifically, the following technical features may be applied in an asynchronous (async) multi-link system that does not require time synchronization between frames/packets/data units transmitted on different links (or bands) in the multi-link. Accordingly, FDU may be referred to in various terms such as an async multi-link technology and an async mode in an STA supporting multi-link.

Referring to FIG. 23, FDU, a technology that enables simultaneous TX/RX transmission in a multi-link environment, may increase BSS average throughput. While an AP is performing DL transmission to STA 3 in link 2, STA 1 may perform UL transmission to the AP through link 1.

Although the STA may flexibly perform TX/RX through FDU, there may be a hidden node problem that occurred even in a BSS according to the existing IEEE 802.11 standard.

Figure 24:
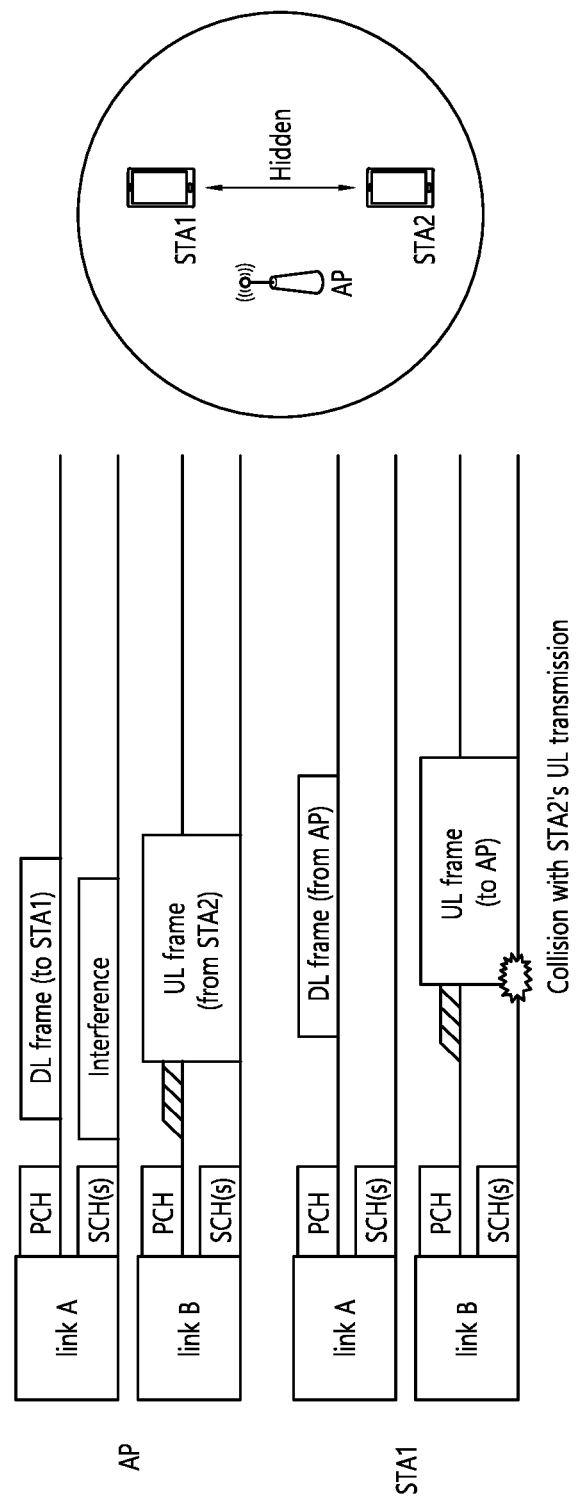
FIG. 24 shows a hidden node problem that occurs in an FDU transmission scheme.

FIG. 24 shows a hidden node problem that occurs in an FDU transmission scheme.

FIG. 24 may show an example of a hidden node problem in which STA 1 and STA 2 have a hidden relationship. If STA 2 transmits a UL frame to an AP through link B (or band B), the AP may transmit a DL frame through back-off only through link A (or band A) because the AP is aware of the corresponding transmission. However, since STA 1 has a hidden relationship with STA 2, it may not be able to recognize STA 2 transmission in link B. Therefore, when STA 1 transmits the UL frame through link B, collision may occur with the UL frame of STA 2.

To solve the above problem, an RTS/CTS may be used as before, but other methods may be used in FDU to reduce overhead. In particular, an STA or AP supporting FDU may flexibly perform transmission for each link (or band). Accordingly, the STA (or AP) may provide information on a frame being transmitted in another link from one link in advance. For example, the STA (or AP) may provide in advance information for setting an NAV for another link in one link.

In the present disclosure, a method for sharing information for setting an NAV in another link when a frame is transmitted in a link to transmit data may be proposed.

In a WLAN system, a transmitting STA may support multi-links including a first link and a second link. In addition, the transmitting STA may support FDU. Each of the first link and the second link may belong to any one of 2.4 GHz, 5 GHz, and 6 GHz bands. In addition, the first link and the second link may belong to different bands.

The transmitting STA may receive a second frame from a second receiving STA through the second link. While receiving the second frame, the transmitting STA may transmit a first frame including information for setting an NAV for the second link to the first receiving STA through the first link. In this case, the first receiving STA may have a hidden relationship with the second receiving STA. Accordingly, the first receiving STA may not be able to detect/identify a signal transmitted from the second receiving STA. Also, the second receiving STA may not be able to detect/identify a signal transmitted from the first receiving STA. While receiving the second frame from the second receiving STA, the transmitting STA may transmit information for setting the NAV for the second link to the first receiving STA to prevent a collision with the second frame.

According to an embodiment, the information for setting the NAV for the second link may be included in a header of a physical layer (PHY) of a first frame. According to an embodiment, the information for setting the NAV for the second link may be included in a header of a medium access control (MAC) layer of the first frame. When the information for setting the NAV is included in the header of the MAC layer of the first frame, the second frame may include a control frame format.

According to an embodiment, the information for setting the NAV for the second link may include a first information field related to a duration value for setting the NAV for the second link in the first receiving STA. For example, the transmitting STA may transmit a duration value for setting the NAV for the second link to the first receiving STA through the first information field. The first receiving STA may set the NAV for the second link based on the duration value for setting the NAV for the second link.

According to an embodiment, the information for setting the NAV for the second link may include a second information field related to a difference between an end point of the first frame and an end point of the second frame. In addition, the information for setting the NAV for the second link may further include a third information field related to a transmission length (or duration) of the first frame. The first receiving STA may set the NAV for the second link based on the second information field and the third information field. For example, the first receiving STA may determine a difference (or sum) of a value of the second information field from a value of the third information field as a duration value for setting the NAV. The first receiving STA may set the NAV for the second link based on the determined duration value for setting the NAV.

According to an embodiment, the information for setting the NAV for the second link may include a second information field related to a difference between the end point of the first frame and the end point of the second frame. In addition, the information for setting the NAV for the second link may further include a fourth information field related to a TXOP length of the first link. The first receiving STA may set the NAV for the second link based on the second information field and the fourth information field. For example, the first receiving STA may determine a difference (or sum) of the value of the second information field from the value of the fourth information field as a duration value for setting the NAV. The first receiving STA may set the NAV for the second link based on the determined duration value for setting the NAV.

Hereinafter, the aforementioned transmitting STA may be referred to as an AP. The aforementioned first receiving STA may be referred to as STA 1, and the second receiving STA may be referred to as STA 2. Also, the first link may be referred to as link A, and the second link may be referred to as link B.

A link (or band) corresponding to the frame information to be shared may be referred to as a shared link (or band). In addition, a link (or band) for sharing the frame information to be shared may be referred to as a transmission link (or band). Referring to FIG. 24, when transmitting a DL frame in link A, the AP may provide information for setting an NAV (hereinafter, NAV information) for a UL frame of link B. Thus, the transmission link may be link A, and the shared link may be link B.

Since NAV information should be shared with all STAs within coverage, not a specific STA, the AP may include the NAV information in the PHY header and transmit the same through a PPDU (or frame). The NAV information may be set/determined through duration comparison between a transmission frame (DL frame) on a transmission link and a reception frame (UL frame) on a shared link.

Figure 25:
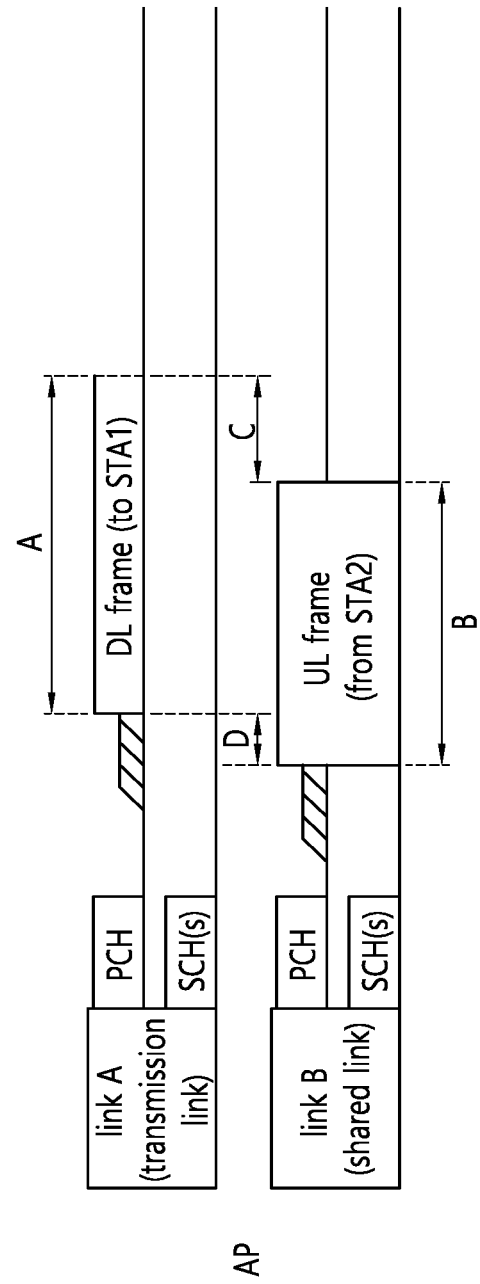
FIGS. 25 and 26 are diagrams illustrating a relationship between a transmission frame and a reception frame.
Figure 26:
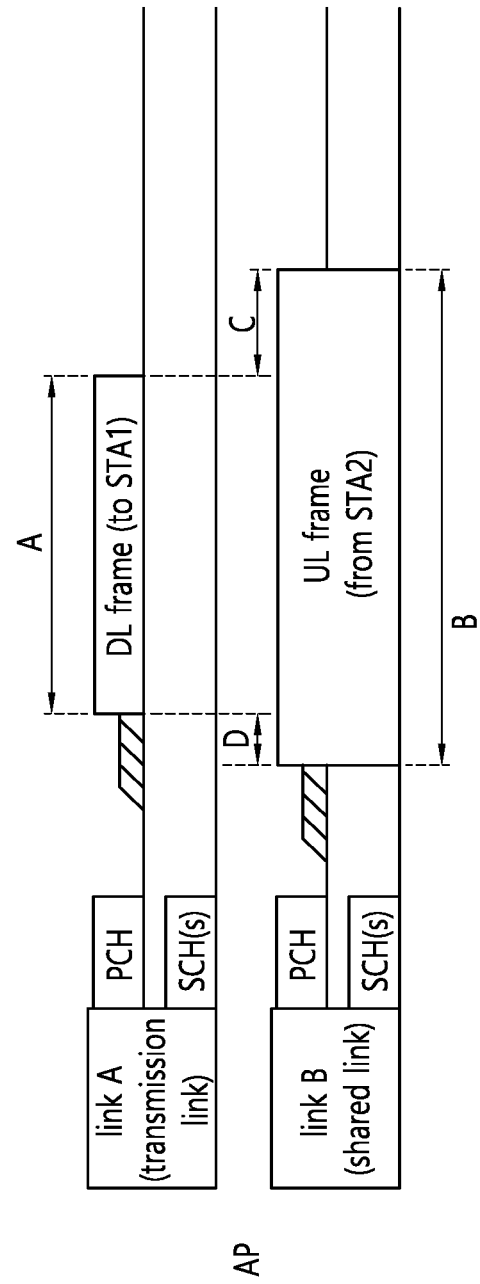

FIGS. 25 and 26 are diagrams illustrating a relationship between a transmission frame and a reception frame.

Referring to FIGS. 25 and 26, an embodiment of FIGS. 25 and 26 may be described based on the embodiment of FIG. 24. FIGS. 25 and 26 may show a relationship between a reception frame (or UL frame) and a transmission frame (or DL frame) from a point of view of the AP. Information for indicating the relationship between the reception frame and the transmission frame may be as follows.

A: Frame duration of the transmission frame In the transmission link for sharing information (or TXOP in the transmission link)

B: Frame duration of the reception frame on the shared link (or TXOP on the shared link)

C: Difference between end points of the transmission frame and the reception frame D: Difference in start time between transmission frame and reception frame Specifically, STA 1 may check information A through a transmission frame (or DL frame). As described above, information A and information B may have a frame duration or may be a TXOP of the frame transmission for protection against multiple frame transmission.

Here, STA 1 may need to acquire information for NAV setting one by one in link A and link B. The information to be acquired one per link may vary depending on whether STA 1 uses information A that may be known through a transmission frame. Hereinafter, a method of transmitting information for setting an NAV for the second link may be described separately as a first embodiment and a second embodiment according to whether information A is used.

First embodiment—In case of not using information A: A method of notifying an NAV value (i.e., B−D) to be set by STA 1 as it is The NAV value to be set by STA 1 may be a value excluding a difference between start time points of a UL frame and a DL frame from a duration of the UL frame. That is, the NAV value may be a value obtained by subtracting a value of information D from a value of information B. A maximum PPDU duration of the IEEE 802.11ax standard may be 5.484 ms. A field for an NAV value may be configured based on difference information between the maximum PPDU duration and a transmitted PPDU (or frame). Accordingly, the field for the NAV value may be composed of 4 bits for granularity 256 us/5 bits for granularity 128 us/4 bits for granularity 64 us. However, the field for the NAV value is not limited thereto. In case of configuring a field for a TXOP value other than a frame duration, a longer duration may be required to indicate the NAV value.

Figure 27:
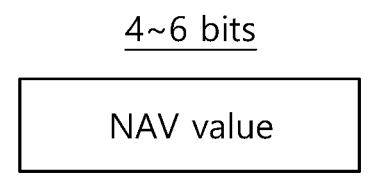

FIG. 27 is a diagram illustrating a field configuration for an NAV value.

Referring to FIG. 27, Table 1 may show a maximum duration value that may be obtained according to the number of bits in the field for a NAV value shown in FIG. 27 and granularity. The aforementioned first information field may include a field for an NAV value.

TABLE 1

| | Number of bits in the field (N) | | |
|---|---|---|---|
| Granularity | 4 bits | 5 bits | 6 bits |
| 32 us | about 0.5 ms | about 1 ms | about 2 ms |
| 64 us | about 1 ms | about 2 ms | about 4 ms |
| 128 us | about 2 ms | about 4 ms | about 8 ms |
| 256 us | about 4 ms | about 8 ms | about 16 ms |

Second Embodiment—In case of using information A: A method of calculating the NAV value by notifying the difference (C) between the end points of two frames, instead of notifying the NAV value (B−D) to be set by STA 1 as it is (i.e. A−C or A+C)

The end of the frame or TXOP of the shared link may be smaller or larger than the end of the frame or TXOP of the transmission link. Therefore, in order to express all of these, the field shown in FIG. 27 may be used. In this case, a negative number C may be expressed by subtracting a specific (or specified) constant value. Therefore, a total length that may be expressed in the field may be divided into positive number C and negative number C. In this case, the constant value may be $-(2^{N-1}-1)*$Granularity. In this case, N may refer to the number of bits in the field. When the STA receives this value, the NAV value may be acquired/calculated through Equation 1 below.

$$\text{NAV} = A + \text{Gap value} - (2^{N-2}-1)*\text{Granularity} \quad [\text{Equation 1}]$$

This method may express both cases (positive number C/negative number C) but an expressible length may be reduced by half, compared to the first embodiment.

Figure 28:
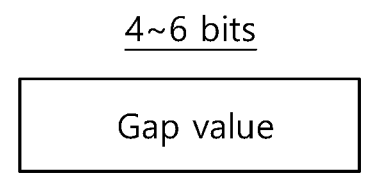

FIG. 28 is a diagram illustrating a field configuration for a gap value.

Referring to FIG. 28, Table 2 may show a maximum duration value that may be obtained according to the number of bits in the field for a gap value shown in FIG. 28 and granularity. The second information field related to the difference between the aforementioned end point of the first frame and the end point of the second frame may include a field for the gap value. Also, the third information field related to the transmission length of the first frame described above may include information A. The values shown in Table 2 represent maximum durations, but actual values of information C may be half. For example, in the case of using 5 bit and 128 us, the value that information C may have may be about −2 ms to about +2 ms.

TABLE 2

| | Number of bits in the field (N) | | | |
|---|---|---|---|---|
| Granularity | 4 bits | 5 bits | 6 bits | Constant |
| 32 us | about 0.5 ms | about 1 ms | about 2 ms | $-(2^{N-1} - 1) * 32\ \mu s$ |
| 64 us | about 1 ms | about 2 ms | about 4 ms | $-(2^{N-1} - 1) * 64\ \mu s$ |
| 128 us | about 2 ms | about 4 ms | about 8 ms | $-(2^{N-1} - 1) * 128\ \mu s$ |
| 256 us | about 4 ms | about 8 ms | about 16 ms | $-(2^{N-1} - 1) * 256\ \mu s$ |

Figure 29:
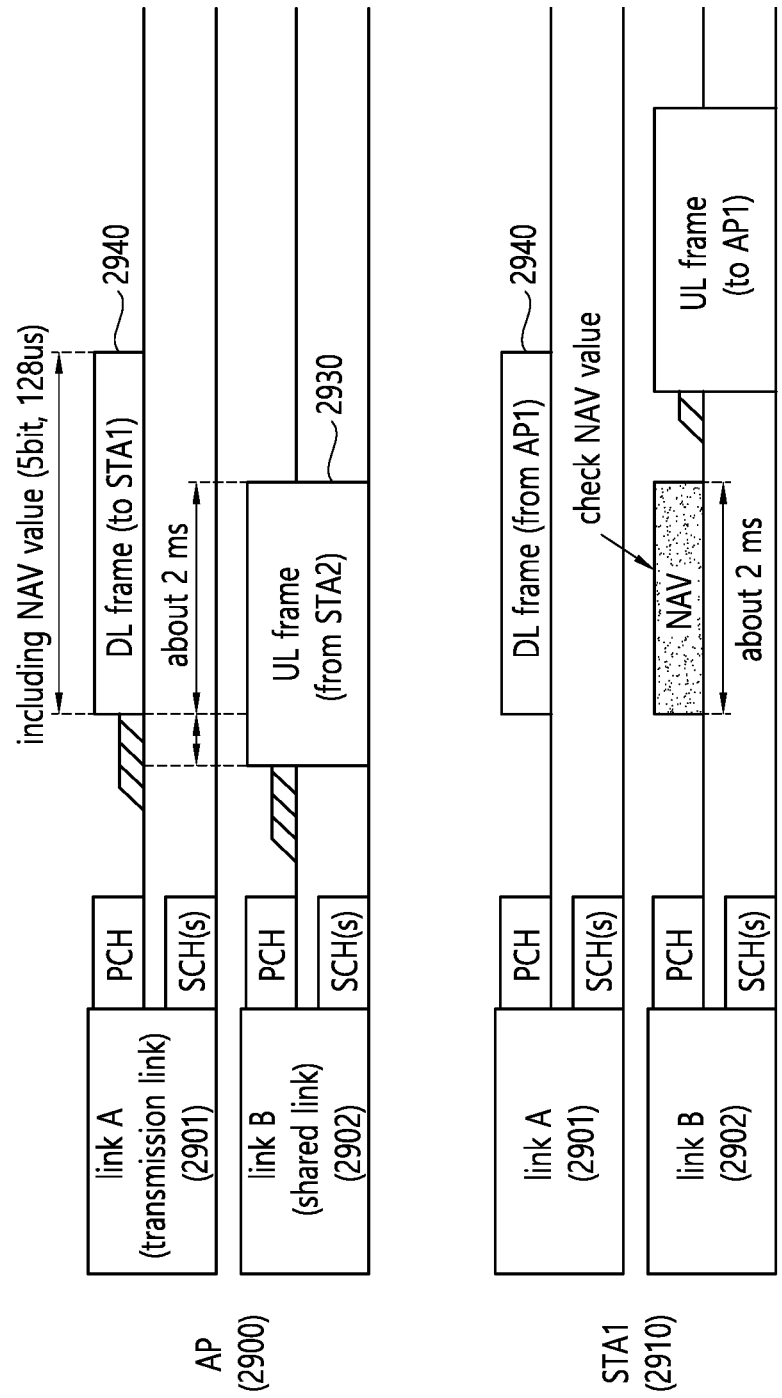
FIG. 29 shows a specific method for describing a first embodiment.

FIG. 29 shows a specific method for describing a first embodiment.

Referring to FIG. 29, AP 2900 may receive UL frame 2930 from STA 2 through link B 2902. Since UL transmission of STA 2 starts first in link B 2902, AP 2900 may provide NAV information to STA 1 2910 through DL transmission to link A 2901. The NAV information may be a value (e.g., 2 ms) excluding a difference in transmission start point between DL frame 2940 of AP 2900 and UL frame 2930 of STA 2 in a frame duration of UL frame 2930.

STA 1 2910 may receive the NAV information from a PHY header of DL frame 2940 and set an NAV as much as a value included in the NAV information. For example, if a field length is 5 bits and the granularity is 128 us, an NAV value of about 2 ms (15*128 us) may be expressed as "11110". In this case, the leftmost bit may refer to a least significant bit (LSB). Accordingly, AP 2900 may transmit DL frame 2940 including a field set to 5 bits to STA 1 2900. STA 1 2910 may set the NAV for link B 2902 based on the received DL frame 2940.

Figure 30:
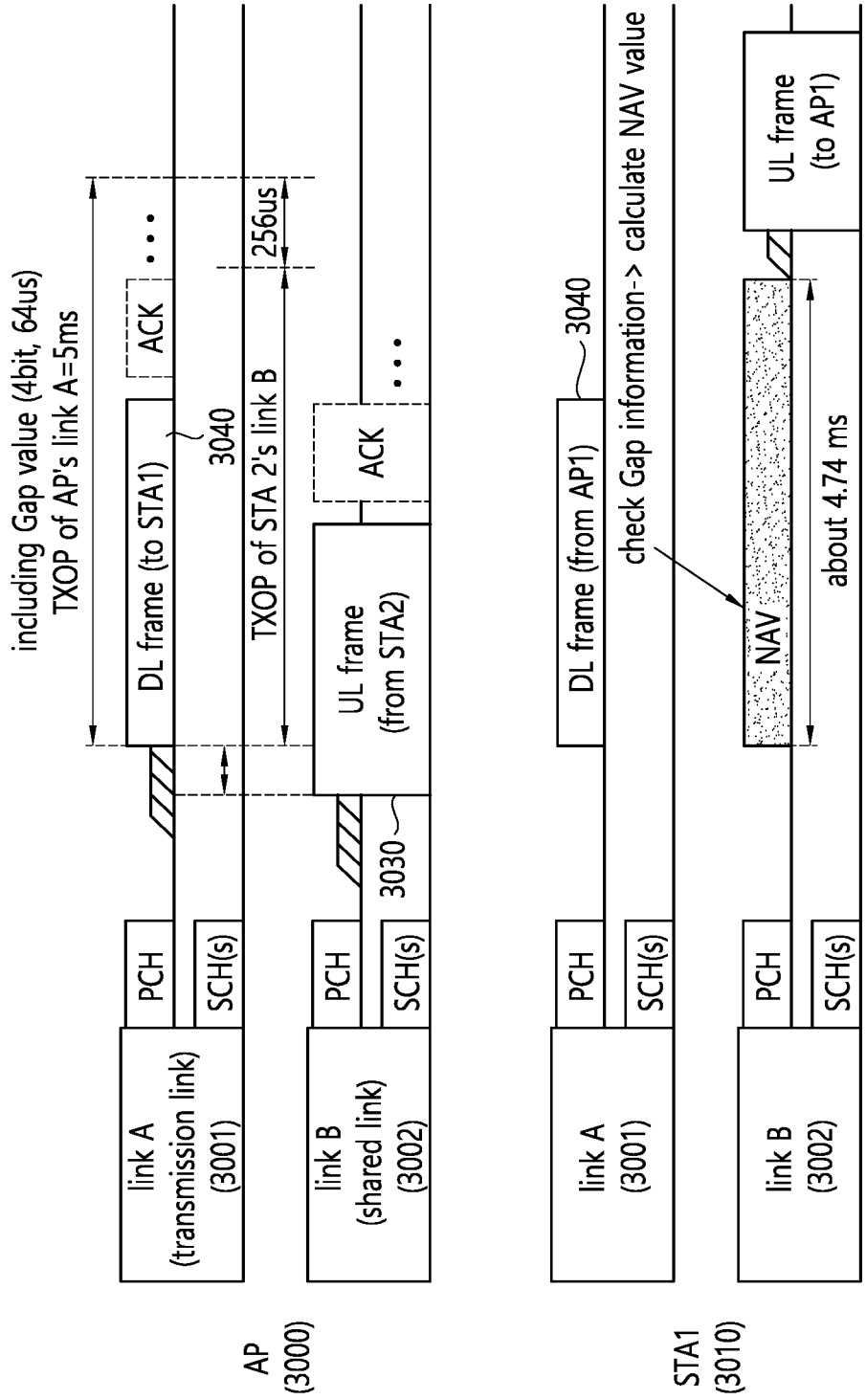
FIG. 30 shows a specific method for describing a second embodiment.

FIG. 30 shows a specific method for describing a second embodiment.

Referring to FIG. 30, FIG. 30 may illustrate a method of transmitting NAV information based on TXOP in the second embodiment. AP 3000 may receive UL frame 3030 from STA 2 through link B 3002. Since the UL transmission of STA 2 starts first in link B 3002, AP 3000 may provide NAV information to STA 1 3010 through DL transmission to link A 3001. The AP 3000 may not provide a NAV value but may provide gap information. In FIG. 30, the gap information may be a difference between a TXOP end point at link B 3002 of STA 2 and a TXOP end point at link A 3001 of AP 3000. The gap information may be a negative number or a positive number. For example, the gap information may be −256 us.

STA 1 3010 may receive gap information from AP 3000 through DL frame 3040. STA 1 3010 may know the TXOP information of AP 3000. The TXOP information of AP 3000 may refer to TXOP information obtained by AP 3000 from link A 3001. Accordingly, STA 1 3010 may acquire/calculate NAV based on the TXOP information and the gap information of AP 3000. For example, if the gap value field has a granularity of 4 bits and 64 us, a constant value to be reduced may be 448 us (7*64 us). In this case, the gap information may be a value obtained by subtracting a constant value from the gap value. When the gap information is −256 us, the gap value may be 192 us (3*64 us) in consideration of the constant value. In this case, the gap value field may be expressed as "1100". The leftmost bit may refer to an LSB. The NAV may be 4744 us (about 4.74 ms), which is a value excluding 256 us from 5 ms, which is TXOP of link A 3001. Accordingly, STA 1 3010 may set the NAV for link B 3002 based on the gap value field and the TXOP of AP 3000.

Figure 31:
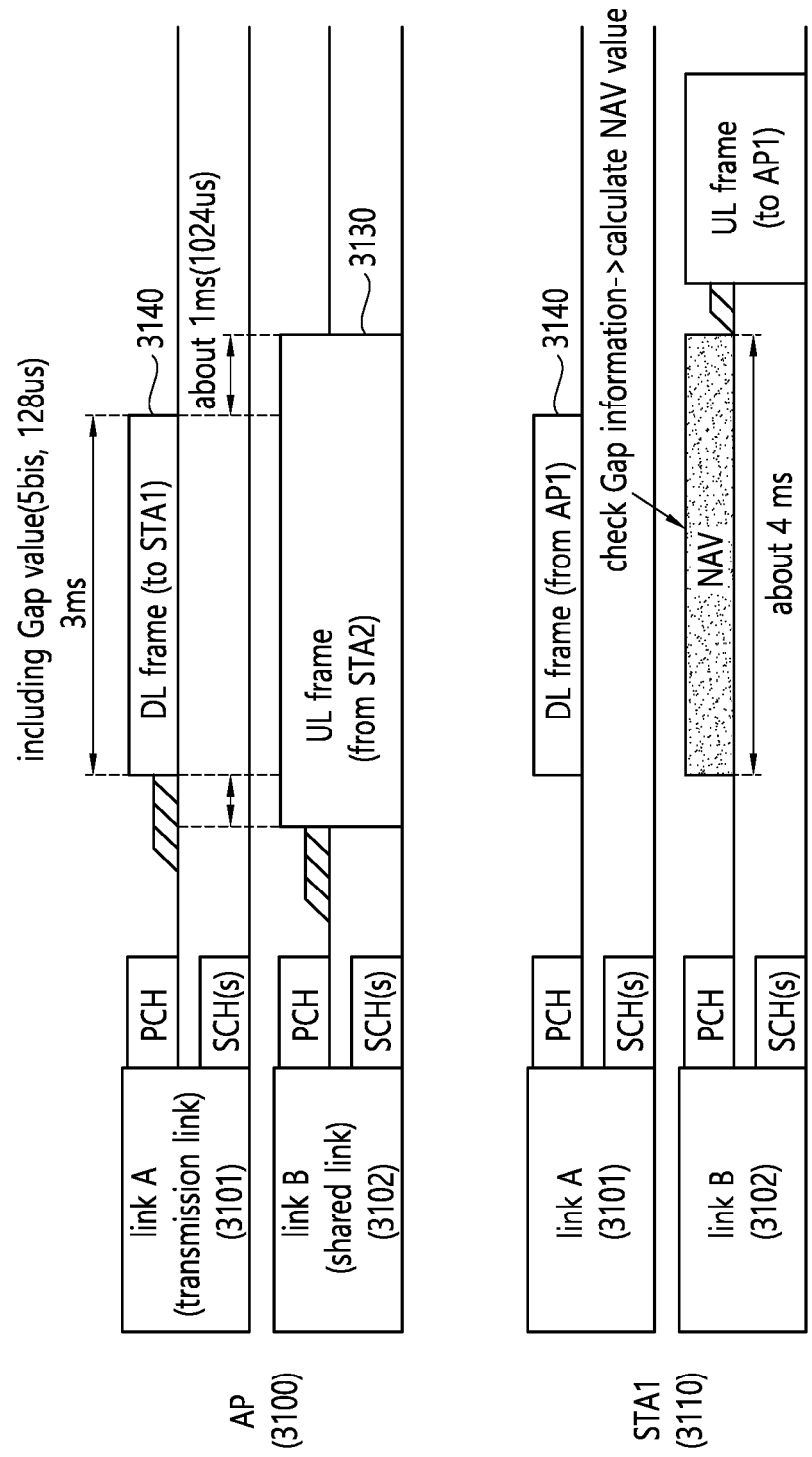
FIG. 31 shows a specific method for describing the second embodiment.

FIG. 31 shows a specific method for describing the second embodiment.

Referring to FIG. 31, FIG. 31 may illustrate a method of transmitting NAV information based on a frame duration in the second embodiment. AP 3100 may receive UL frame 3130 from STA 2 through link B 3102. Since UL transmission of STA 2 starts first in link B 3102, AP 3100 may provide NAV information to STA 1 3110 through DL transmission to link A 3101. AP 3100 may not provide a NAV value, but may provide the gap information. In FIG. 31, the gap information may be a difference between an end point of UL frame (or frame duration of the UL frame) 3130 in link B 3102 of STA 2 and an end point of DL frame (or frame duration of the DL frame) in link A 3101 of AP 3100. The gap information may be a negative number or a positive number. For example, the gap information may be about 1 ms.

STA 1 3110 may receive gap information from AP 3100 through DL frame 3140. STA 1 3110 may know frame duration information of DL frame 3140. Accordingly, STA 1 3110 may acquire/calculate an NAV based on frame duration information and gap information of the DL frame 3140. In this case, the gap information may be a value obtained by subtracting a constant value from the gap value. For example, if the gap value field has a granularity of 5 bits and 128 us, a constant value to be reduced may be 1920 us (15*128 us). Since the gap information of FIG. 31 is a positive number, the gap value may be 2944 us (23*128 us) in consideration of the constant value when it is 1024 us (about 1 ms). In this case, the gap value field may be expressed as "11101". The leftmost bit may refer to an LSB. The NAV may be 4024 us (about 4 ms), which is a value obtained by adding 1024 us to 3 ms, which is the frame duration of DL frame 3140 of AP 3100. Accordingly, STA 1 3110 may set the NAV for link B 3102 based on the gap value field and the TXOP of the AP 3100.

In the following, a method of informing NAV information using a MAC header may be described.

In the aforementioned embodiment, the method of indicating NAV information for a shared link in a PHY header has been described, but there may be a case in which a channel status or NAV value is notified to a specific STA rather than all STAs within coverage. Accordingly, in this case, the transmitting STA may inform a specific STA by transmitting NAV information using a new control frame or an existing control frame or may indicate the NAV information in the MAC header. A specific method may be as follows 1) Method of using a new control frame or an existing control frame Before data transmission, a new control frame may be transmitted first to inform about the following contents, and contents included in the new control frame may be as follows.

NAV value (e.g., NAV value according to the first or second embodiment) or channel status (i.e., 1 for BUSY other than NAV value and 0 for IDLE)
 Band/link and/or channel information that may be additionally included when an indication is required A new control frame including the contents may operate as follows. An interval of each frame is SIFS, but may not be limited thereto.

i) The transmitting STA may transmit a new control frame.

ii) The receiving STA may transmit an immediate response frame when necessary. For example, if it operates like a CTS-to-self frame, an immediate response frame may not be transmitted.

iii) The transmitting STA may transmit data after receiving the immediate response frame or transmitting the new control frame.

Figure 32:
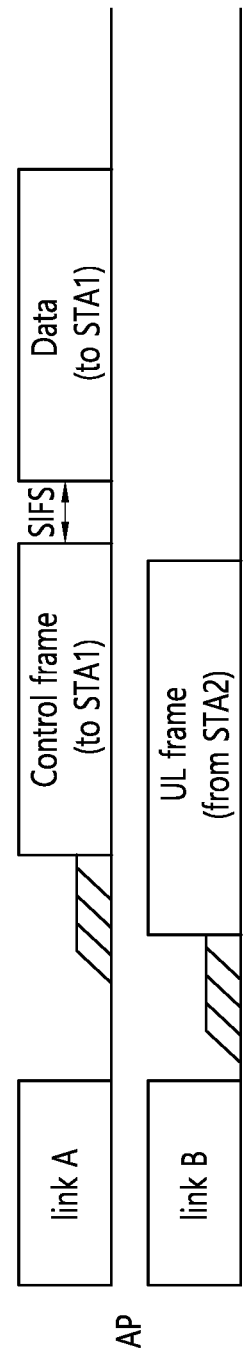
FIG. 32 shows an example of an operation process of a new control frame.

FIG. 32 shows an example of an operation process of a new control frame.

Referring to FIG. 32, an AP may receive a UL frame from STA 2 of link B. While receiving the UL frame, the AP may first inform STA 1 of the NAV information through the aforementioned contents through a control frame. Thereafter, the AP may transmit data to STA 1 after SIFS.

According to an embodiment, an existing control frame (e.g., RTS/CTS-to-self, etc.) may be used to transmit the NAV information. According to an embodiment, a bit may be added to an existing control frame or a reserved bit may be used to transmit the NAV information. The reserved bit may include the following contents.

NAV value (e.g., NAV value according to the first or second embodiment) or channel status (i.e., 1 for BUSY other than NAV value and 0 for IDLE)
    Band/link and/or channel information that may be additionally included when an indication is required
    2) Method of using new control field type When data is transmitted, a new control field may be added to the MAC header to indicate, and included contents may be as follows.

NAV value (e.g., NAV value according to the first or second embodiment) or channel status (i.e., 1 for BUSY other than NAV value and 0 for IDLE)
    Band/link and/or channel information that may be additionally included when an indication is required
    3) Method of using reserved bits of the existing control field The AP may indicate channel status information using reserved bits for each Control ID present in the existing A-control field of the MAC header, and contents included for each control ID may be as follows.

i) Reserved bit (1 bit) of TRS/HLA control field
    Channel status (i.e., 1 for BUSY and 0 for IDLE)
    However, it is informed only for one band/channel, not a plurality of bands/channels.
    ii) Reserved bits (2 bits) of UPH/BQR control field
    Channel status (i.e., 1 for BUSY and 0 for IDLE)
    Band and/or channel information that may be additionally included when an indication is required
    However, the channel status of up to two bands/channels may be informed, but when the band/channel information is included, only one band/channel may be informed.
    iii) Reserved bits (5 bits) in CAS control field
    NAV value or channel status (i.e., 1 for BUSY other than NAV value and 0 for IDLE)
    Band and/or channel information that may be additionally included when an indication is required
    A length of NAV duration may be up to 5 bits.

Figure 33:
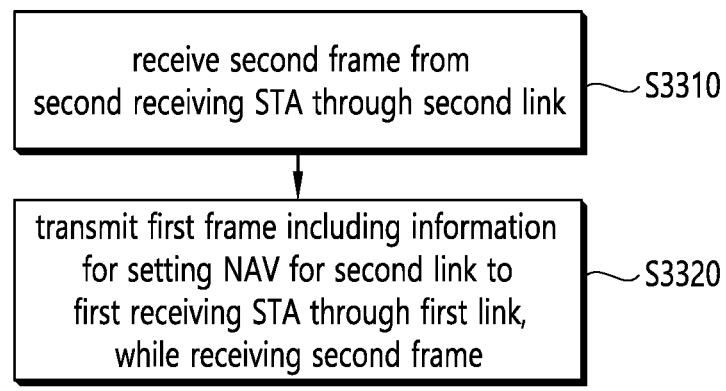
FIG. 33 is a flowchart illustrating an operation of a transmitting STA.
Figure 34:
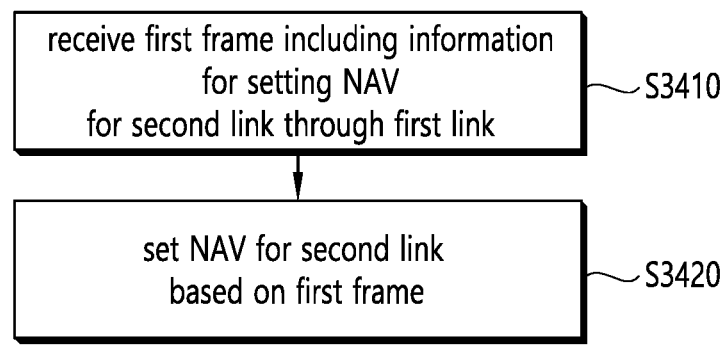
FIG. 34 is a flowchart illustrating an operation of a first receiving STA.

Hereinafter, FIGS. 33 and 34 are flowcharts illustrating operations of a transmitting STA and a first receiving STA. The process flowcharts of FIGS. 34 and 35 may be variously modified. For example, the order of detailed steps shown in FIGS. 34 and 35 may be changed.

Figure 35:
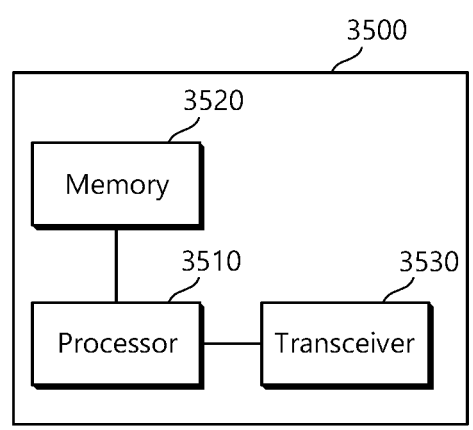
FIG. 35 shows a transmitting STA or a receiving STA (first/second receiving STA) to which an example of the present disclosure is applied.

Also, detailed steps separately indicated in FIGS. 34 and 35 may be performed simultaneously. In addition, steps not shown in FIGS. 34 and 35 may be additionally performed or steps shown in FIGS. 34 and 35 may be omitted.

FIG. 33 is a flowchart illustrating an operation of a transmitting STA.

Referring to FIG. 33, in step S3310, a transmitting STA (e.g., AP 2900, 3000, or 3100) may receive a second frame (e.g., a UL frame 2930, 3030, or 3130) from a second receiving STA through a second link. The transmitting STA may support multi-links including a first link (e.g., link A 2901, 3001, or 3101) and a second link (e.g., link B 2902, 3002, or 3102). In addition, the transmitting STA may support FDU. Each of the first link and the second link may belong to any one of 2.4 GHz, 5 GHz, and 6 GHz bands. In addition, the first link and the second link may belong to different bands.

In step S3320, while receiving the second frame, the transmitting STA may transmit a first frame (e.g., DL frame 2940, 3040, or 3140) including information for setting a NAV for the second link to the first receiving STA (e.g., STA 1 2910, 3010, or 3110) through the first link. In this case, the first receiving STA may have a hidden relationship with the second receiving STA. Accordingly, while receiving the second frame from the second receiving STA, the transmitting STA may transmit information for setting the NAV for the second link to the first receiving STA to prevent a collision.

The information for setting the NAV for the second link may be included in a header of a physical layer (PHY) of the first frame. The information for setting the NAV for the second link may also be included in a header of a MAC layer of the first frame. When the information for setting the NAV is included in the header of the MAC layer of the first frame, the second frame may include a control frame format.

According to an embodiment, the information for setting the NAV for the second link may include a first information field related to a duration value for setting the NAV for the second link in the first receiving STA. Accordingly, the transmitting STA may transmit the duration value for setting the NAV for the second link to the first receiving STA through the first information field.

According to an embodiment, the information for setting the NAV for the second link may include a second information field related to a difference between an end point of the first frame and an end point of the second frame. In addition, the information for setting the NAV for the second link may further include a third information field related to a transmission length (or duration) of the first frame. Accordingly, the transmitting STA may transmit the second information field and the third information field to the first receiving STA.

According to an embodiment, the information for setting the NAV for the second link may include a second information field related to a difference between the end point of the first frame and the end point of the second frame. In addition, the information for setting the NAV for the second link may further include a fourth information field related to an TXOP length of the first link. Accordingly, the transmitting STA may transmit the second information field and the fourth information field to the first receiving STA.

FIG. 34 is a flowchart illustrating an operation of a first receiving STA.

Referring to FIG. 34, in step S3410, a first receiving STA (e.g., STA 1 2910, 3010, or 3110) may receive a first frame (e.g., DL frame 2940, 3040, or 3140) including information for setting an NAV for a second link (e.g., link B 2902, 3002, or 3102) from the transmitting STA (e.g., AP 2900, 3000, or 3100) through the first link (e.g., link A 2901, 3001, or 3101). The first receiving STA may support multi-links including the first link and the second link. In addition, the transmitting STA may support FDU.

The information for setting the NAV for the second link may be included in the header of the physical layer PHY of the first frame. The information for setting the NAV for the second link may also be included in the header of the MAC layer of the first frame. When the information for setting the NAV is included in the header of the MAC layer of the first frame, the second frame may include a control frame format.

In step S3420, the first receiving STA may set the NAV for the second link based on the first frame.

According to an embodiment, the information for setting the NAV for the second link may include a first information field related to a duration value for setting the NAV for the second link in the first receiving STA. The first receiving STA may set the NAV for the second link based on the duration value for setting the NAV for the second link.

According to an embodiment, the information for setting the NAV for the second link may include a second information field related to a difference between the end point of the first frame and the end point of the second frame. In addition, the information for setting the NAV for the second link may further include a third information field related to the transmission length (or duration) of the first frame. The first receiving STA may set the NAV for the second link based on the second information field and the third information field. For example, the first receiving STA may determine a difference (or sum) of the value of the second information field from the value of the third information field as a duration value for setting the NAV. The first receiving STA may set the NAV for the second link based on the determined duration value for setting the NAV.

According to an embodiment, the information for setting the NAV for the second link may include a second information field related to a difference between the end point of the first frame and the end point of the second frame. In addition, the information for setting the NAV for the second link may further include a fourth information field related to the TXOP length of the first link. The first receiving STA may set the NAV for the second link based on the second information field and the fourth information field. For example, the first receiving STA may determine a difference (or sum) of the value of the second information field from the value of the fourth information field as a duration value for setting the NAV. The first receiving STA may set the NAV for the second link based on the determined duration value for setting the NAV.

FIG. 35 shows a transmitting STA or a receiving STA (first/second receiving STA) to which an example of the present disclosure is applied.

Referring to FIG. 35, an STA 3500 may include a processor 3510, a memory 3520, and a transceiver 3530. The feature of FIG. 35 may be applied to a non-AP STA or an AP STA. The illustrated processor, memory, and transceiver may be implemented as separate chips, or at least two or more blocks/functions may be implemented through a single chip.

The illustrated transceiver 3530 performs a signal transmission/reception operation. Specifically, the transceiver 3530 may transmit and receive IEEE 802.11 packets (e.g., IEEE 802.11a/b/g/n/ac/ax/be, etc.).

The processor 3510 may implement the functions, processes, and/or methods proposed in the present disclosure. Specifically, the processor 3510 may receive a signal through the transceiver 3530, process a received signal, generate a transmission signal, and perform control for signal transmission.

The processor 3510 may include an application-specific integrated circuit (ASIC), another chipset, a logic circuit, and a data processing device. The memory 3520 may include read-only memory (ROM), random access memory (RAM), flash memory, memory card, storage medium, and/or other storage device.

The memory 3520 may store a signal (i.e., a received signal) received through the transceiver, and may store a signal (i.e., a transmission signal) to be transmitted through the transceiver. That is, the processor 3510 may acquire the received signal through the memory 3520 and store the signal to be transmitted in the memory 3520.

Figure 36:
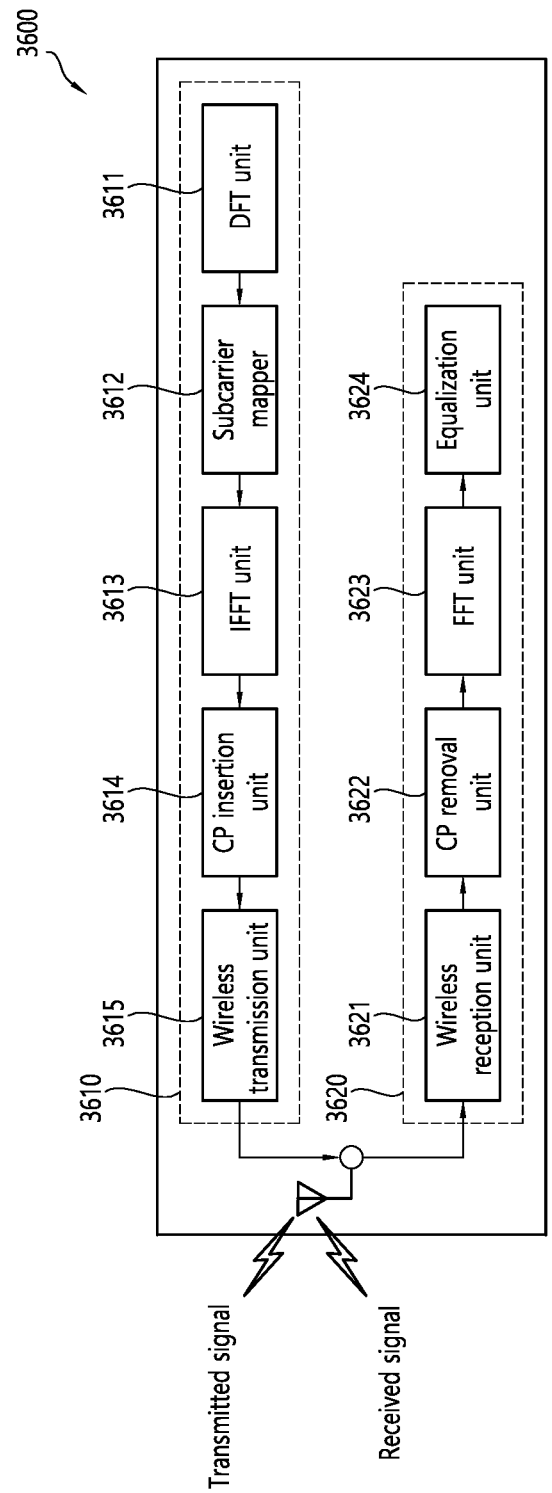
FIG. 36 shows another example of a detailed block diagram of a transceiver.

FIG. 36 shows another example of a detailed block diagram of a transceiver. Some or all blocks of FIG. 36 may be included in the processor 3510. Referring to FIG. 36, the transceiver 3600 includes a transmitting part 3610 and a receiving part 3620. The transmitting part 3610 includes a discrete Fourier transform (DFT) unit 3611, a subcarrier mapper 3612, an IDFT/IFFT (inverse fast Fourier transform) unit 3713, a CP insertion unit 3614, and a wireless transmission unit 3615. The transmitting part 3610 may further include a modulator. In addition, the transmitting part 3610 may further include, for example, a scramble unit (not shown), a modulation mapper (not shown), a layer mapper (not shown), and a layer permutator (not shown), and this may be disposed before the DFT unit 3611. That is, in order to prevent an increase in a peak-to-average power ratio (PAPR), the transmitting part 3610 allows information to first pass through the DFT unit 3611 before mapping a signal to a subcarrier. The signal spread by the DFT unit 3611 (or precoded in the same sense) is mapped through the subcarrier mapper 3612 and generated as a signal on a time axis through the IDFT/IFFT unit 3713.

The DFT unit 3611 performs DFT on input symbols and outputs complex-valued symbols. For example, when Ntx symbols are input (Ntx is a natural number), a DFT size is Ntx. The DFT unit 3611 may be referred to as a transform precoder. The subcarrier mapper 3612 maps the complex symbols to each subcarrier in a frequency domain. The complex symbols may be mapped to resource elements corresponding to a resource block allocated for data transmission. The subcarrier mapper 3612 may be referred to as a resource element mapper. The IDFT/IFFT unit 3613 performs IDFT/IFFT on the input symbols and outputs a baseband signal for data which is a time domain signal. The CP insertion unit 3614 duplicates a portion of a rear part of the baseband signal for data and inserts it into a front part of the baseband signal for data. Inter-symbol interference (ISI) and inter-carrier interference (ICI) may be prevented through CP insertion, so that orthogonality may be maintained even in a multipath channel.

On the other hand, the receiving part 3620 includes a wireless receiving unit 3621, a CP removal unit 3622, an FFT unit 3623, an equalization unit 3624, and the like. The wireless receiving unit 3621, the CP removal unit 3622, and FFT unit 3623 of the receiving part 3620 perform inverse functions of the wireless transmitting unit 3615, the CP inserting unit 3614, and the IFFT unit 3613 at the transmitting part 3610. The receiving part 1902 may further include a demodulator.

In addition to the illustrated blocks, the transceiver of FIG. 36 may include a reception window controller (not shown) for extracting a part of a received signal and a decoding operation processing unit for performing a decoding operation on a signal extracted through the reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed in a wireless local area network (WLAN) system, the method comprising:
    receiving, by a transmitting station (STA) supporting multiple links including a first link and a second link, a second frame from a second receiving STA through the second link; and
    transmitting, by the transmitting STA, a first frame including information for setting a network allocation vector (NAV) for the second link to a first receiving STA through the first link, while receiving the second frame.

2. The method of claim 1,
    wherein the information for setting the NAV for the second link includes first information field related to a duration value for setting the NAV for the second link.

3. The method of claim 1,
    wherein the information for setting the NAV for the second link includes a second information field related to a difference between an end point of the first frame and an end point of the second frame, and
    wherein the information for setting the NAV for the second link further includes a third information field related to a transmission length of the first frame.

4. The method of claim 1,
    wherein the information for setting the NAV for the second link is included in a header of a physical layer of the first frame.

5. The method of claim 1,
    wherein the information for setting the NAV for the second link is included in a header of a medium access control (MAC) layer of the first frame.

6. The method of claim 5,
    wherein the first frame includes a control frame format.

7. The method of claim 1,
    wherein each of the first link and the second link belongs to any one of 2.4 GHz, 5 GHz, and 6 GHz bands, and the first link and the second link belong to different bands.

8. A transmitting station (STA) supporting multiple links including a first link and a second link, the transmitting station comprising:
    a transceiver configured to transmit or receive a wireless signal; and a processor connected to the transceiver, wherein the processor is configured to receive a second frame from a second receiving STA through the second link and to transmit a first frame including information for setting a network allocation vector (NAV) for the second link to a first receiving STA through the first link, while receiving the second frame.

9. The transmitting station of claim 8,
wherein the information for setting the NAV for the second link includes first information field related to a duration value for setting the NAV for the second link.

10. The transmitting station of claim 8,
wherein the information for setting the NAV for the second link includes a second information field related to a difference between an end point of the first frame and an end point of the second frame, and wherein the information for setting the NAV for the second link further includes a third information field related to a transmission length of the first frame.

11. The transmitting station of claim 8,
wherein the information for setting the NAV for the second link is included in a header of a physical layer of the first frame.

12. The transmitting station of claim 8,
wherein the information for setting the NAV for the second link is included in a header of a medium access control (MAC) layer of the first frame.

13. The transmitting station of claim 12,
wherein the first frame includes a control frame format.

14. The transmitting station of claim 8,
wherein each of the first link and the second link belongs to any one of 2.4 GHz, 5 GHz, and 6 GHz bands, and the first link and the second link belong to different bands.

* * * * *